(12) United States Patent
Odyrna et al.

(10) Patent No.: US 7,424,551 B2
(45) Date of Patent: Sep. 9, 2008

(54) PASSIVE VIDEO MULTIPLEXING METHOD AND APPARATUS PRIORITY TO PRIOR PROVISIONAL APPLICATION

(75) Inventors: Vic Odyrna, Action, MA (US); Philip M. Kirshtein, New Market, AL (US); Christopher L. Thomas, Madison, AL (US)

(73) Assignee: Avocent Corporation, Huntsville, AL (US)

( * ) Notice: Subject to any disclaimer, the term of this patent is extended or adjusted under 35 U.S.C. 154(b) by 734 days.

(21) Appl. No.: 09/951,774

(22) Filed: Sep. 14, 2001

(65) Prior Publication Data

US 2002/0143996 A1 Oct. 3, 2002

Related U.S. Application Data

(60) Provisional application No. 60/279,461, filed on Mar. 29, 2001.

(51) Int. Cl.
*G06F 15/16* (2006.01)

(52) U.S. Cl. .................. 709/250; 709/248; 709/249; 709/223; 709/224

(58) Field of Classification Search .............. 709/249, 709/248, 250, 223, 224
See application file for complete search history.

(56) References Cited

U.S. PATENT DOCUMENTS

| | | | |
|---|---|---|---|
| 2,667,553 | A | 1/1954 | Moorhead et al. |
| 2,870,287 | A | 1/1959 | Corbitt et al. |
| 4,103,252 | A | 7/1978 | Bobick |
| 4,395,610 | A | 7/1983 | Downs et al. |
| 4,919,117 | A | 4/1990 | Muchisky et al. |
| 4,927,787 | A | 5/1990 | Patel |

(Continued)

FOREIGN PATENT DOCUMENTS

| | | |
|---|---|---|
| JP | H10-91300 | 4/1998 |
| JP | 2000-115591 | 4/2000 |
| WO | WO 00/17766 A2 | 3/2000 |
| WO | WO 01/84291 | 11/2001 |

OTHER PUBLICATIONS

Kimara Andreas, "KVM Switch Solutions," Mar. 1, 2001, Network Technologies Inc., pp. 1-38.*

(Continued)

*Primary Examiner*—John Follansbee
*Assistant Examiner*—Nghi V Tran
(74) *Attorney, Agent, or Firm*—Davidson Berquist Jackson & Gowdey LLP

(57) ABSTRACT

A passive video multiplexing method and apparatus for encoding video synchronization signals within a KVM extension system. A Rack Interface Pod (RIP) is provided for receiving video signals from a network server and providing them to a remote user via a local area network (LAN). The analog signals received by the RIP are transmitted to a Rack Connection Manager (RCM) having video processing logic, a supervisory processor, a KVM switch system, and Ethernet interface circuitry. A plurality of ARI systems are connected to the RCM, and a plurality of network servers, intended to be controlled by the remote user, are connected to each ARI by a respective wiring strip or Pod Expansion Module (PEM). The RCM performs selective switching by sourcing current through a pair of diodes associated with an active channel of the PEM while reverse biasing diodes associated with an inactive channel to select a network server among the plurality of network servers. Switching of video is accomplished without processing the video signals.

14 Claims, 21 Drawing Sheets

U.S. PATENT DOCUMENTS

| | | | |
|---|---|---|---|
| 4,927,987 A | 5/1990 | Kirchgessner | |
| 5,033,813 A | 7/1991 | Westfall | |
| 5,188,542 A | 2/1993 | Ballman | |
| 5,192,226 A | 3/1993 | Wang | |
| 5,260,532 A | 11/1993 | Tinder et al. | |
| 5,272,525 A | 12/1993 | Borchardt et al. | |
| 5,353,409 A | 10/1994 | Asprey et al. | |
| 5,535,036 A | 7/1996 | Grant | |
| 5,573,425 A | 11/1996 | Morisawa et al. | |
| 5,637,013 A | 6/1997 | Weber | |
| 5,708,897 A | 1/1998 | Manabe et al. | |
| 5,742,718 A | 4/1998 | Harman et al. | |
| 5,744,754 A | 4/1998 | Strang et al. | |
| 5,775,939 A | 7/1998 | Brown | |
| 5,792,986 A | 8/1998 | Lee | |
| 5,850,209 A | 12/1998 | Lemke et al. | |
| 5,926,509 A | 7/1999 | Stewart et al. | |
| 5,929,386 A | 7/1999 | Hornick | |
| 6,112,264 A | 8/2000 | Beasley et al. | |
| 6,137,455 A * | 10/2000 | Duo | 345/520 |
| 6,150,997 A | 11/2000 | Asprey | |
| 6,185,643 B1 | 2/2001 | Kirshtein et al. | |
| 6,192,433 B1 | 2/2001 | Chan et al. | |
| 6,256,014 B1 | 7/2001 | Thomas et al. | |
| 6,329,616 B1 | 12/2001 | Lee | |
| 6,343,080 B1 | 1/2002 | Kondo | |
| 6,345,323 B1 | 2/2002 | Beasley et al. | |
| 6,373,476 B1 | 4/2002 | Dalgleish et al. | |
| 6,378,014 B1 | 4/2002 | Shirley | |
| 6,388,658 B1 * | 5/2002 | Ahern et al. | 345/168 |
| 6,449,866 B1 | 9/2002 | Murray | |
| 6,482,042 B1 | 11/2002 | Tupper | |
| 6,498,890 B1 | 12/2002 | Kimminau | |
| 6,521,836 B1 | 2/2003 | Simonazzi | |
| 6,557,170 B1 * | 4/2003 | Wilder et al. | 725/130 |
| 6,580,044 B2 | 6/2003 | Ogawa et al. | |
| 6,601,124 B1 | 7/2003 | Blair | |
| 6,609,034 B1 | 8/2003 | Behrens et al. | |
| 6,618,774 B1 * | 9/2003 | Dickens et al. | 710/64 |
| 6,623,295 B2 | 9/2003 | DeLadurantaye, III | |
| 6,633,935 B1 | 10/2003 | Chan et al. | |
| 6,671,756 B1 | 12/2003 | Thomas et al. | |
| 6,672,896 B1 | 1/2004 | Li | |
| 6,748,005 B1 | 6/2004 | Riazi et al. | |
| 6,983,340 B1 | 1/2006 | Hermanson et al. | |
| 2001/0034157 A1 | 10/2001 | DeLadurantaye, III | |
| 2001/0044843 A1 | 11/2001 | Bates et al. | |
| 2001/0053627 A1 | 12/2001 | Armistead et al. | |
| 2002/0081907 A1 | 6/2002 | Olson et al. | |
| 2002/0143996 A1 | 10/2002 | Odryna et al. | |
| 2003/0123677 A1 | 7/2003 | Tran | |
| 2003/0188049 A1 | 10/2003 | Dickens | |
| 2004/0001323 A1 | 1/2004 | Chen | |
| 2004/0044822 A1 | 3/2004 | Chen | |
| 2004/0066790 A1 | 4/2004 | Valavi et al. | |

OTHER PUBLICATIONS

Office Action issued Apr. 25, 2007 in Japanese patent application No. 2002-578172.

Bernstein, Control Data Center Servers, Systems Management, pp. 99-101, Dell Copyright 2004 (Oct.).

Office Action mailed Apr. 18, 2007 in corresponding Japanese Patent Application No. 2003-524097, with translation (English).

* cited by examiner

DIODE SWITCHED VIDEO CURRENT PATH ILLUSTRATION FOR TWO TRANSMITTERS ONE OF THREE VIDEO CHANNELS SHOWN

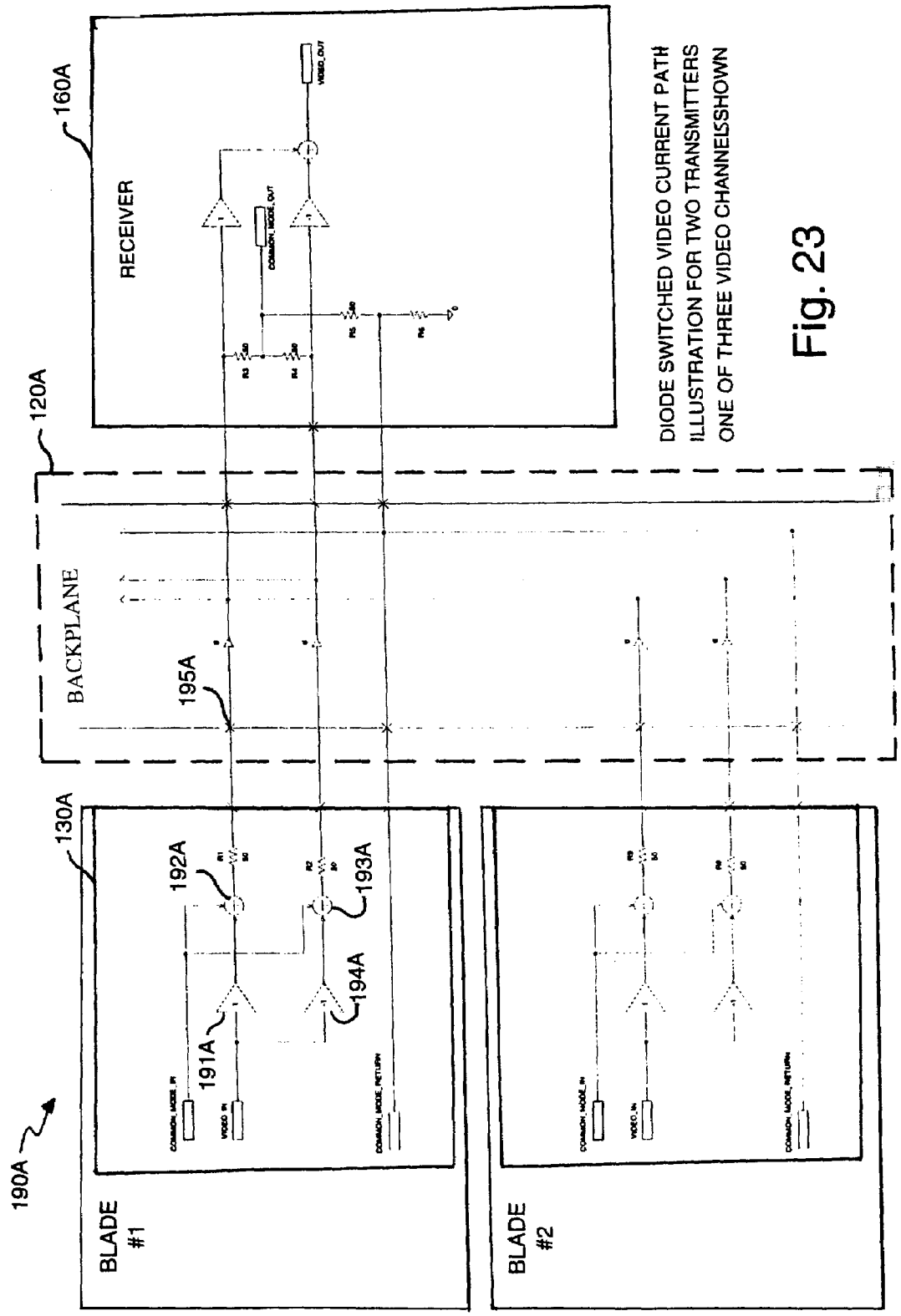

PASSIVE VIDEO MULTIPLEXING METHOD AND APPARATUS PRIORITY TO PRIOR PROVISIONAL APPLICATION

PRIORITY TO PRIOR PROVISIONAL APPLICATION

Priority is claimed to Provisional Application Ser. No. 60/279,461, filed on Mar. 29, 2001, the entire content of which is hereby incorporated by reference in this application.

FIELD OF INVENTION

The present invention relates to a method of connecting to and performing user and administrative functions on remote computer systems. More specifically, it relates to a passive video multiplexing extension system and a method for network based access of those remote computers by users and administrators.

BACKGROUND AND SUMMARY OF THE INVENTION

In a typical computer network there are a number of client computers that are coupled via communication links to several network server resources. These resources include, for example, file servers, print servers, modem servers, and CD ROM servers. Each server is usually a stand-alone computer with its own keyboard, video, and mouse monitor (KVM). Each client computer utilizes the functions provided by the server computers through respective communication links.

In some computer applications, it is desirable to connect one or more users to one or more computers. It is also desirable at times to do so when users and computers are at different locations. For example, users increasingly desire to access information from several computers located at remote locations via a peripheral switch, such as a KVM switch. In such cases, a user could remain at one location and cause the peripheral switch to selectively attach to one of several computers. It is also possible to use peripheral switches to selectively connect several users to a plurality of remote computers.

Video signals produced by a remote computer are routinely transmitted through a KVM (keyboard, mouse, video) extender to a remote user. In one approach, in order to minimize the number of wires extending between a remote computer/server and the remote user location, horizontal and vertical sync signals as well as mode signals are encoded with the analog video signal.

In another approach, a dedicated communication channel is provided from a remote site to serve as a means for coupling to the peripheral switch. The dedicated communication channel could use the same propriety protocol language as the local peripherals for control and status functions. Security features may also be controlled from the remote site. In yet another approach, the method of providing a remote peripheral connection uses a local area network (LAN).

The KVM switches and extenders are known devices and are commercially available. Examples of these KVM switches are commercially marketed by Avocent Corporation of Huntsville, Ala. as the Autoview family of products and the XP family of products. Avocent Corporation also markets KVM switches under the names Outlook and ViewPoint. The KVM switch 12 provides a number of functions in the embodiment of FIG. 1. First, when servers 13 boot up, the KVM switch 12 emulates keyboard, video and mouse initiation commands such that each of the servers 13 believes that it is actually connected to a single keyboard, video and mouse workstation. The KVM switch is programmed to emulate keyboard, video and mouse initiation commands in accordance with one of any number of different KVM standards, such as Sun, PS2, etc. for keyboard/mouse, and VGA, SVGA, etc. for video. In addition, the KVM switch 12 polls the workstation requirements (such as the type of mouse, type of monitor, and type of keyboard) and provides data conversions that are necessary for otherwise inconsistent keyboard, video, and mouse devices to communicate with the servers 13.

With the introduction of large numbers of computers, the need for a network operator to access many thousands of computers becomes acute. Of course, KVM switches can be scaled in increasing numbers in order to accommodate the growing numbers of computers that must be attached to a few workstations, but the number of scaled KVM switches becomes a space consideration even in large server areas.

Still referring to FIG. 1, an exemplary KVM switch system is shown in FIG. 1 and generally indicated at 10. A plurality of servers 13 are connected to a KVM switch indicated at 12. A user at 11 is capable of controlling each of the servers 13 through KVM switch 12. The operation of the server and the communication protocol used by the switching system 10 are well-known and therefore will not be repeated here for the sake of clarity. It will be appreciated that many different protocols can be employed for the servers 13 to communicate with the switching system 10 and that many protocols will be developed in the future to increase efficiency of data travel on the network and encompassing by the servers 13. The present invention is not limited to any particular one.

FIGS. 2-5 show various prior approaches for eliminating bulky cabling. Specifically, FIG. 2 shows a rack level server access in the KVM switch environment. FIG. 3 illustrates an approach as indicated at 30 that eliminates bulky and cumbersome cabling in rack-type environments. Here, a KVM switch daisy chain approach is shown. This approach includes a plurality of racks such as for example, identified by numeral 33 into which an internal PCI switching card is inserted. Each PCI switching card is located in a respective rack 33. Each PCI card is further interlinked in a daisy chain fashion by a CAT5 cable to a remote user 31. Each rack 33 includes a server. The configuration shown in FIG. 3 is determined to be feasible to a distance of up to 110 meters. Also, since system 30 occupies a single PCI slot for each server disposed in rack 33, a failure with respect to one server in the rack disables access to some or all servers on the system. Furthermore, system 30 permits a single operator at a time to reach all the servers, and is further restrictive of expansion to an enterprise wide solution.

Referring now to FIG. 5 (which is a blowup of a portion of FIG. 4), there is shown another approach for eliminating cable clutter. The system shown at FIGS. 4 & 5, however, works with specific machines. The propriety cable shown in the figure only comes in certain lengths, and therefore the cable must be constructed to service any computer in the rack. As with the prior approaches, any signal failure disables access to some or all network servers. Furthermore, this approach facilitates only one operator at a time to reach the network servers.

Passive extension schemes used in prior systems fail to work in the context of keyboard (K) and mouse (M) information beyond a distance of approximately 20 ft. Beyond this distance, wire extensions for K and M signals become problematic due to inadequate signal rise times caused by cable capacitance. Furthermore, passive cabling systems become bulky when individual wire connections are provided for every required connection.

Although it may be possible to install dedicated communication links to each server computer in order to allow a system administrator to operate the network from a central location, a large number of cables may be required for anything other than a very simple network. Thus, there is a need to overcome the problems encountered by prior systems.

Accordingly, a passive video multiplexing method and apparatus for encoding video synchronization signals within a KVM extension system is proposed to overcome the problems encountered by prior systems.

In the present invention, a Rack Interface Pod (RIP) is provided for receiving video signals from a server computer and providing them to a remote user via a local area network (LAN), preferably an Ethernet LAN. The analog signals received by the RIP are transmitted via Avocent Rack Interconnect (ARI) ports to the Rack Connection Manager (RCM) which includes video processing logic, a supervisory processor, a KVM switch system, and Ethernet interface circuitry. A plurality of ARI systems are connected to the RCM, and a plurality of network servers, intended to be controlled by the remote user, are connected to each ARI by a respective wiring strip or Pod Expansion Module (PEM). The remote user connected to the Ethernet LAN has the capability of selecting a particular network server among the plurality of network servers through the PEM. The remote user is also capable of selecting a particular network server that is directly connected to an ARI port of the RCM. The circuitry located within the RCM (hereinafter "RCM processor" or "digitizing subsystem") digitizes the KVM signals from a selected network server and forwards the digitized signals to the remote user via the Ethernet LAN. Likewise, the remote users' K and M strokes are passed via the Ethernet LAN to the RCM processor which in-turn passes the signals to the selected network server via the ARI and PEM in the event the network server is connected to the PEM. Remote user's K & M strokes are passed via ARI ports to a network server that is directly connected to the ARI ports.

Each Rack Interface Pod (RIP) includes a processor which emulates K and M signals for a respective network server. Each RIP further provides a mechanism for switching which network server's video signals are passed through the PEM to the RCM. This method of switching video signals is performed by encoding differential R, G, B video signals from a respective network server around a common mode (CM) voltage. Specifically, the common mode voltages are raised or lowered in order to select the active video signal paths from a network server. Each (PEM) further includes a pair of switching diodes per differential video channel for each connection to a common switched differential video channel forming in essence a two pole multiple throw diode switching system. By providing both common mode and differential mode terminations at the receiving end of the bus, individual video channels may be turned on/off by varying the common mode voltages associated with the individual network servers, thus either forward biasing or reverse biasing the switching diodes associated with those channels. If a network server is not selected, then the video source of that particular server, to the PEM, is turned off in the RIP in order to eliminate any capacitive coupling through the reverse biased diodes in the (PEM) and to the RCM.

In the present invention, the Analog Long Interconnect ports provide access by a remote user via either a network based workstation or by direct peripheral attachment through the Analog Internet Protocol Video (IPV) module.

In the preferred embodiment of the present invention, any number of users can communicate on the Ethernet LAN, and any number of servers can be accessed by any of the users. The preferred embodiment provides unlimited scalability while allowing each user to gain console access to any of the associated servers.

In one aspect, the present invention proposes a keyboard, video, mouse (KVM) server management system, comprising a plurality of network interfaces having network ports communicating KVM signals to a plurality of remote user workstations. The remote user workstations are conversely coupled to the network and communicate keyboard and mouse (K, M) signals to a plurality of serves via their corresponding network ports. The KVM server management system further includes a switch for communicating KVM signals between the remote user workstations and a select network server from among the plurality of network servers.

In another aspect, the present invention provides method of switching video signals in a keyboard, video, mouse (KVM) server management system, the method including differentially encoding a plurality of video signal channel from a plurality of network severs around a plurality of common mode voltages; incorporating a pair of diodes in each video signal channels, each pair of diodes connecting to a common differential channel and controlled to switch among the plurality of video signal channels; and selecting a video signal from a select network server from among the plurality of network servers.

In another aspect, the present invention provides a method of encoding video synchronization signals $H_{sync}$, $V_{sync}$ within a keyboard, video, mouse (KVM) extension system, the method including encoding R, G, B video signals differentially around their respective common mode voltage signals, the common mode signals representing encoded functions of combinations of the video synchronization signals; and differentially driving R, G, B video signals so as to allow removal of their respective common mode signals, such that (i) the net of alternating current produced by each of the differential video signals is zero; (ii) the net alternating current produced by encoded synchronization signals is zero.

In yet another aspect, the present invention provides a method of encoding video synchronization signals within a keyboard, video, mouse (KVM) server management system, the method including the steps of providing a plurality of interface ports for receiving KVM signals from a plurality of servers, each interface port including a differential video channel; providing a pair of switching diodes for each differential video channel; multiplexing different video channels down to common differential channels; encoding R, G, B video signals around their respective common mode signals for each differential channel; differentially driving R, G, B video signals and their respective common mode signals, the common mode signals representing functions of video synchronization signals $H_{sync}$ and $V_{sync}$, respectively; switching individual differential video channels by varying common mode voltages of respective individual differential channels, and forward biasing or reverse biasing the switching diodes for enabling or disabling a respective differential channel; and providing both common mode and differential mode terminations at a receiving end of the R, G, B video signals so as to remove common mode signals from the video signals and extract original video synchronization signals.

In another embodiment, the present invention relates to a KVM server management system having a network interface unit, at least one switch to convert native KVM signals from a server into an intermediate format for transmission over corresponding lines, at least one switch communicatively coupled to a least one interface port for communicating K and M signals between a select server among a plurality of servers coupled to the switch via corresponding lines. Each line comprising a plurality of wires, and each wire including a single diode, wherein R, G, B signals are encoded around their respective common mode voltage signals using a sync-on-green encoding on one of the color components in order to select a server among a plurality of servers.

Lastly, the present invention provides a method of interfacing to KVM signals as provided by an Analog Long Interconnect (ALI), an extended distance version of the KVM channel interface with differentially driven R, G, B video with video synchronization encoded on the respective common mode signals and providing corrective frequency compensation for the transmission losses encountered by the R, G, B channels in the extended cabling, as described in prior art, and provides for multiplexing between a plurality of these extensions an interfacing and through a network interface to a remote user.

BRIEF DESCRIPTION OF THE DRAWINGS

FIG. 23 illustrates an alternative example embodiment of a rack interconnect channel circuit incorporated into a blade server architecture.

DETAILED DESCRIPTION OF THE INVENTION

Figure 12:
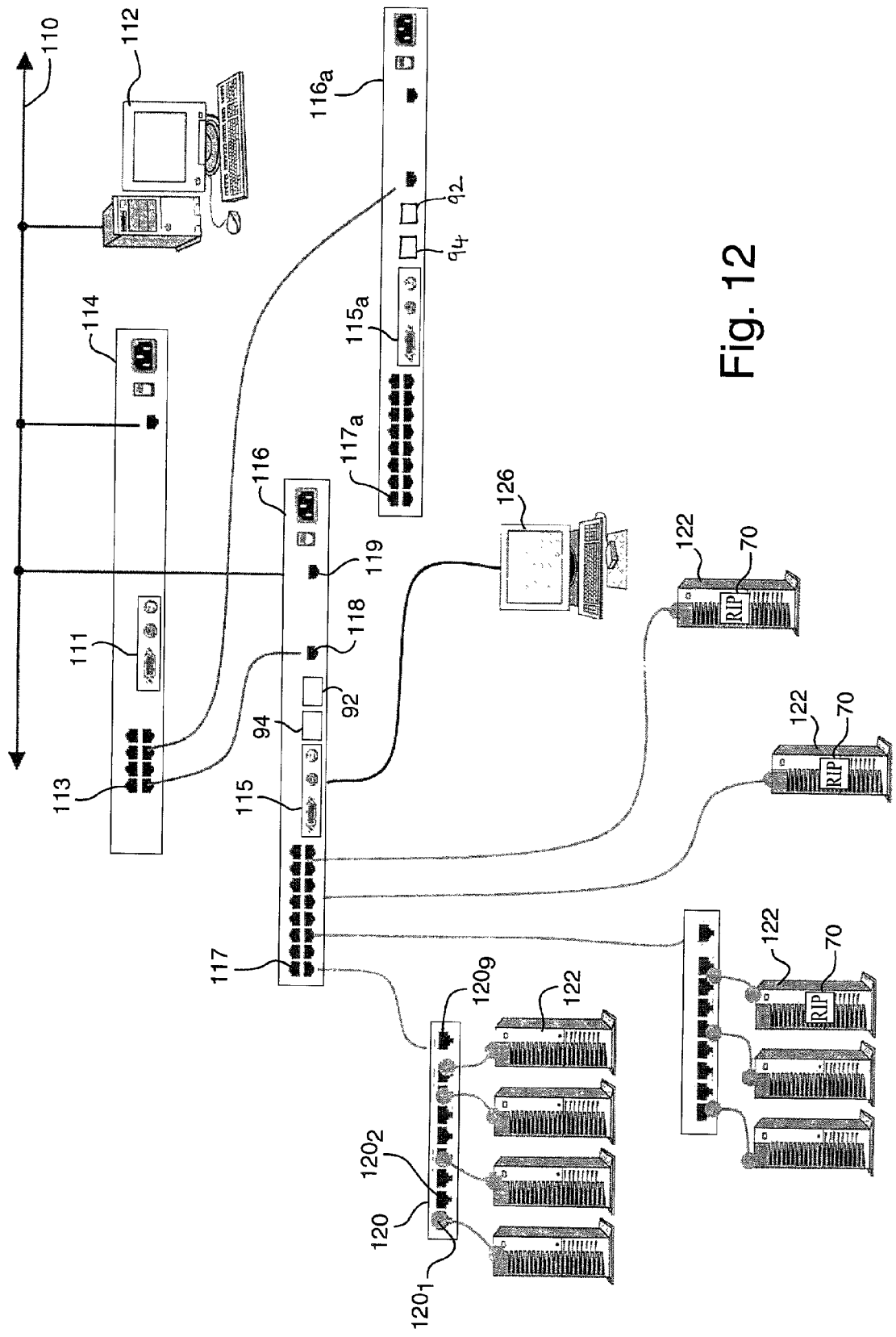
FIG. 12 illustrates a sample configuration of the passive video multiplexing and extension system in accordance with an example embodiment of the present invention.

Referring now to FIG. 12, there is shown a schematic representation of the passive video multiplexing and extension system of the present invention. System 100 includes a corporate LAN 110 to which a remote user 112 is communicatively coupled. In the preferred embodiment, the corporate LAN could be a wide area network (WAN), a packet switching network, such as for example, the Internet, or any other network type. The present invention provides two paths by which the remote user 112 may communicate via LAN 110 to a server 122. One path is via the LAN 110, the Internet Protocol Video (IPV) module 114 to the RCM 116 and then to the server 122. In one embodiment, network servers 122 may be directly connected to RCM 116. In another embodiment, network servers 122 are connected through PEM 120. The second path is directly from the LAN 110 to RCM 116 and then to the server 122.

Figure 16:
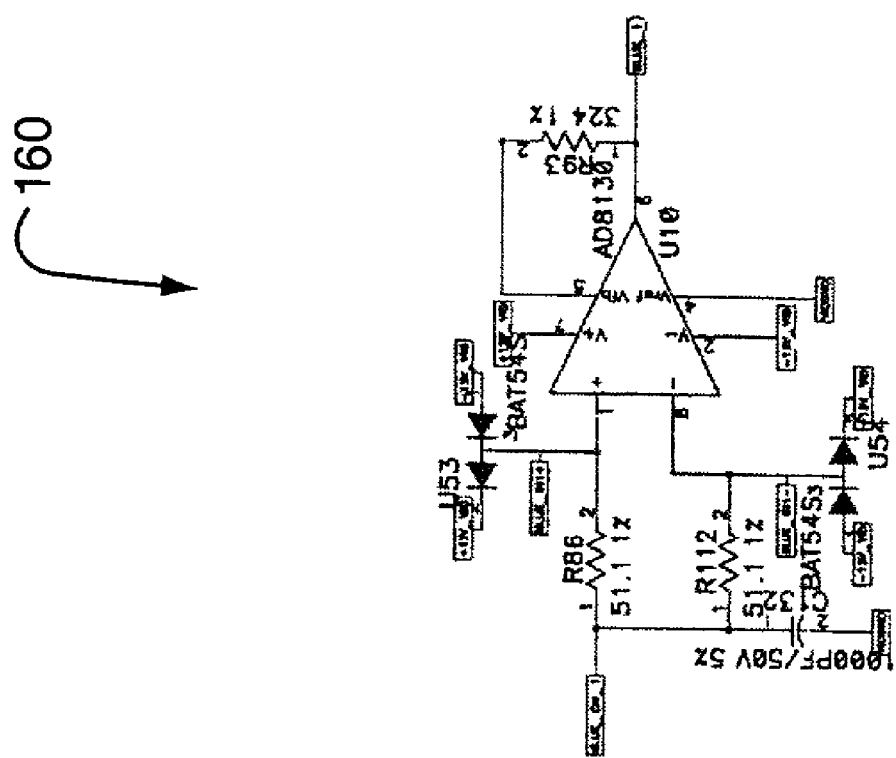
FIG. 16 illustrates an exemplary receiver circuit for a single channel in accordance with an example embodiment of the present invention.

When the communication is via the Internet Protocol Video (IPV) module 114, keyboard and mouse (KM) signals generated by the remote user 112 are received in the IPV module 114. A single IPV module and a single remote user are shown for the sake of brevity, although greater numbers are also envisioned within the invention. IPV module 114 further includes a plurality of input ports 113 and a KVM local access port 111. Each input port of the IPV module 114 may be connected to a Rack Connection Manager (RCM) 116 or to an Avocent Longline Interconnect ALI) transmitter (not shown). The RCM 116 includes video receiver circuitry as shown in FIG. 16. In the exemplary embodiment of FIG. 12, only two RCMs 116, 116$_a$ are shown to be connected to IPV 114. In fact, each IPV is capable of providing connections up to a total of eight RCMs.

Figure 15:
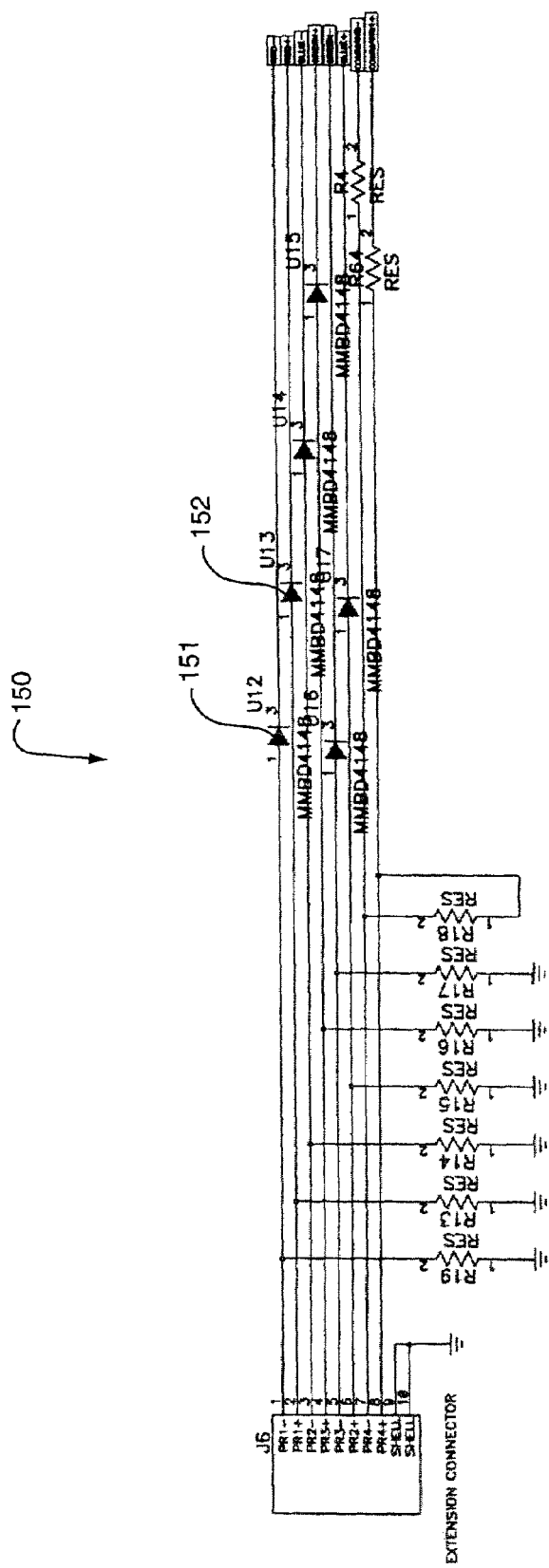
FIG. 15 illustrates an exemplary wiring circuit which includes diode differential pairs, the wiring circuit being located in the PEM and associated with a respective part of the wiring strip in accordance with an example embodiment of the present invention.

Each RCM 116 includes a KVM local access port 115, an Avocent Long Interconnect (ALI) port 118, a LAN port 119, and a plurality of input ports 117. Each input port 117 is capable of connecting to a PEM 120, or to a server 122. A plurality of network servers 122 may be connected to respective ports of the PEM wiring strip 120. Each port of the wiring strip 120 includes switching circuitry 150 having a plurality of pairs of differential diodes 151, 152 as shown in FIG. 15. In the exemplary embodiment of FIG. 12, each wiring strip 120 is shown to include 9 ports (120$_1$-120$_9$). Signals from ports 120$_1$-120$_8$ are combined in port 120$_9$ and forwarded to receiver circuitry (FIG. 16) incorporated within RCM 116.

Figure 1:
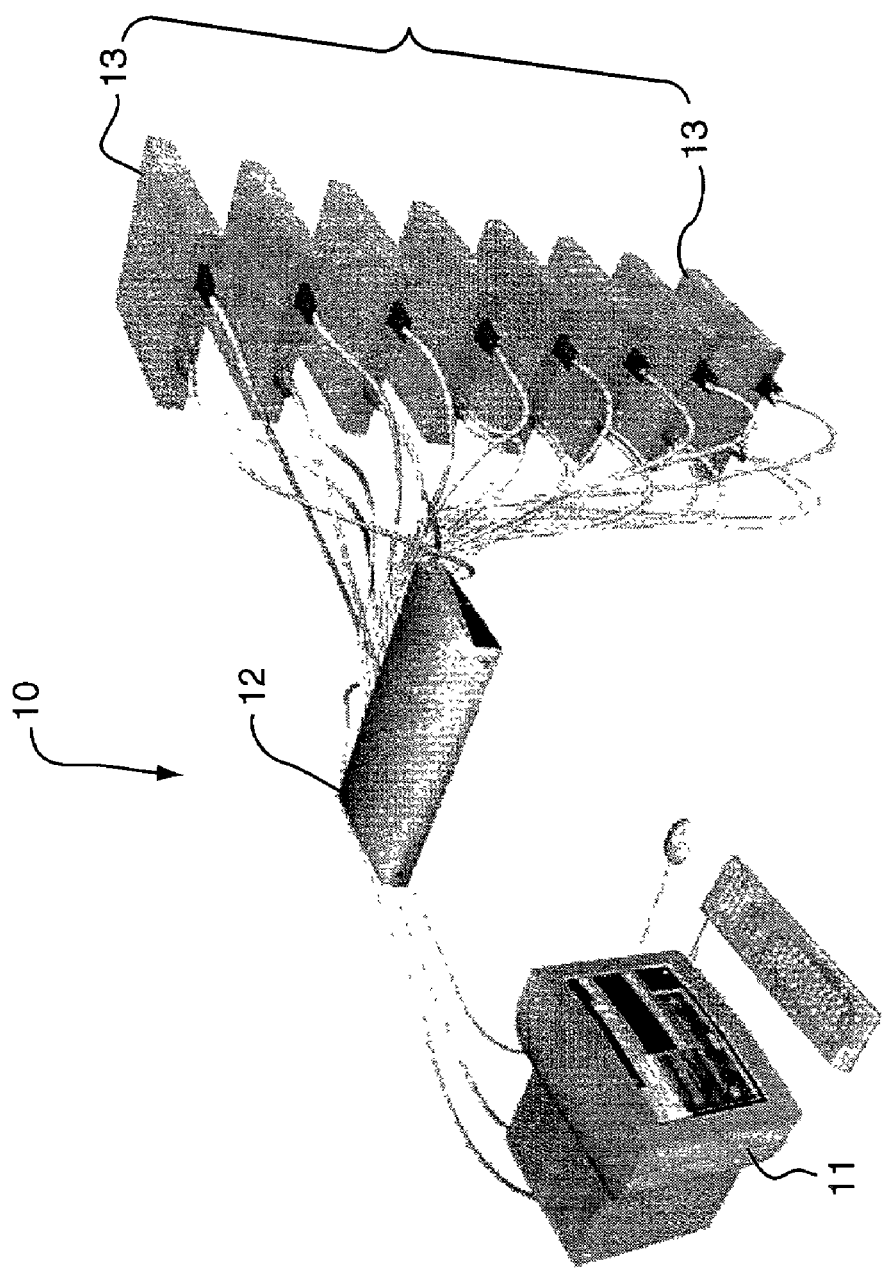
FIGS. 1-5 illustrate prior approaches of interconnecting a remote user to a plurality of network servers.
Figure 2:
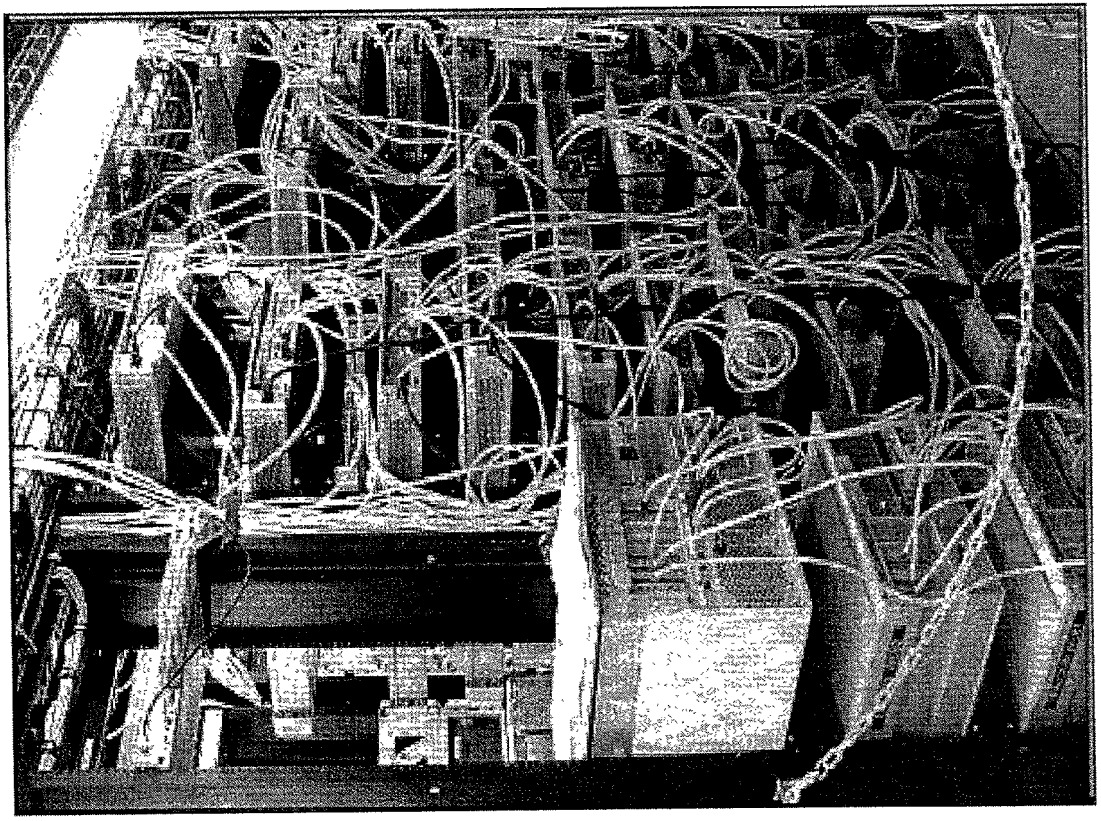
Figure 3:
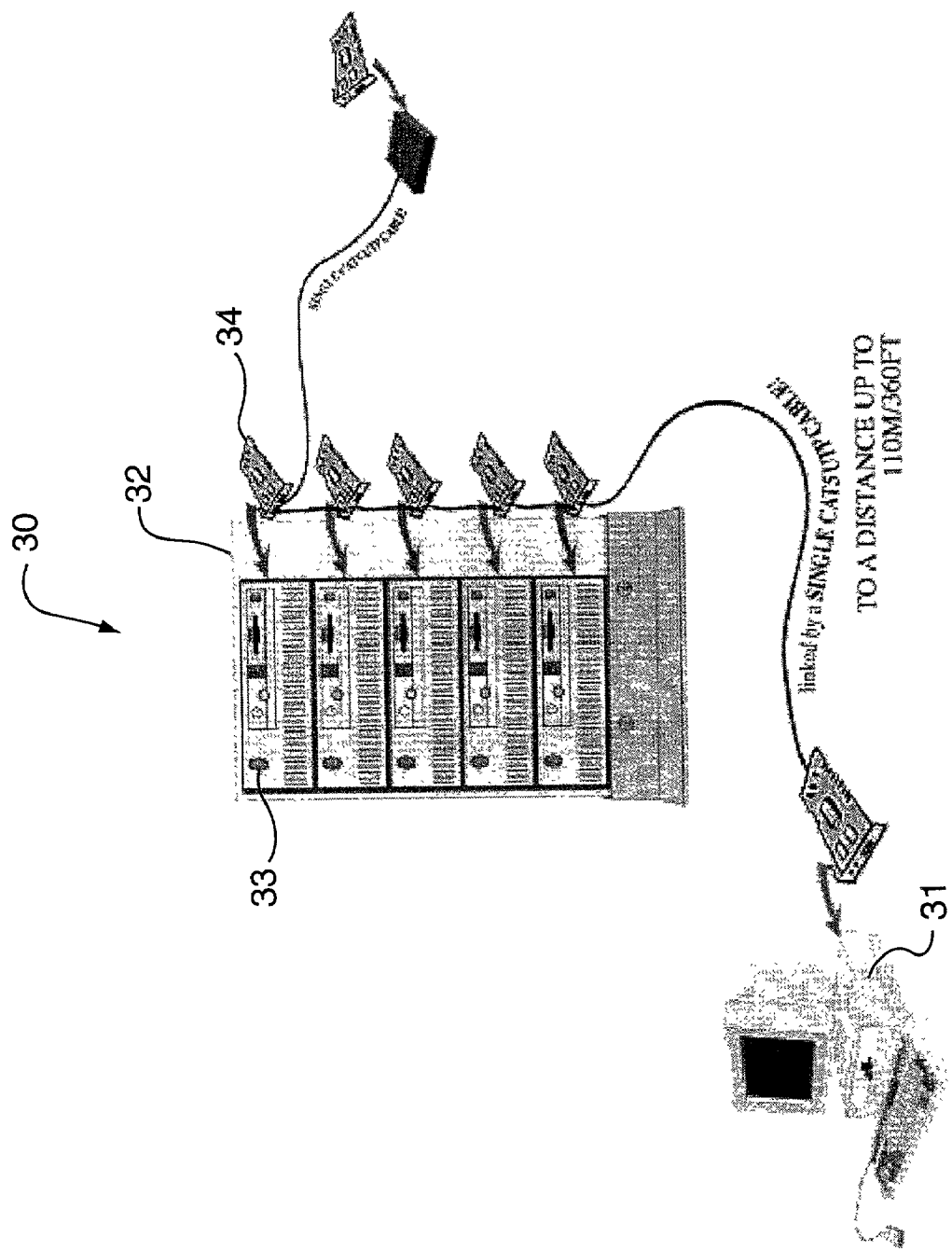
Figure 4:
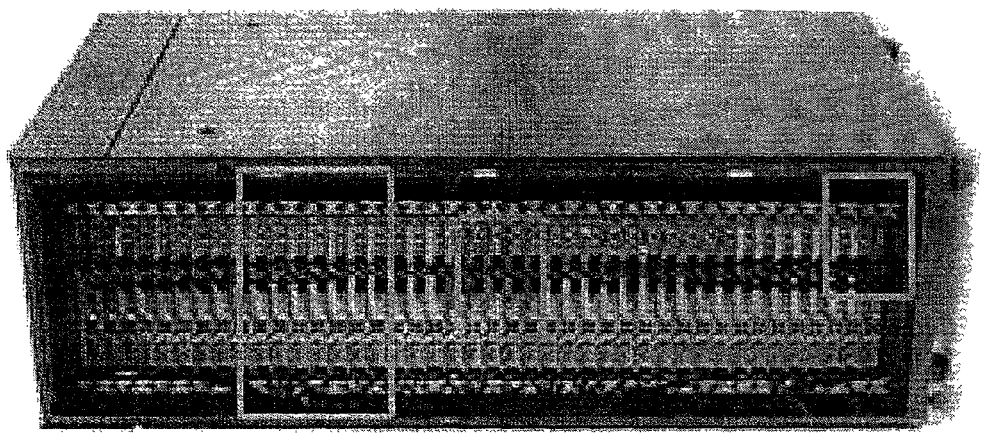
Figure 5:
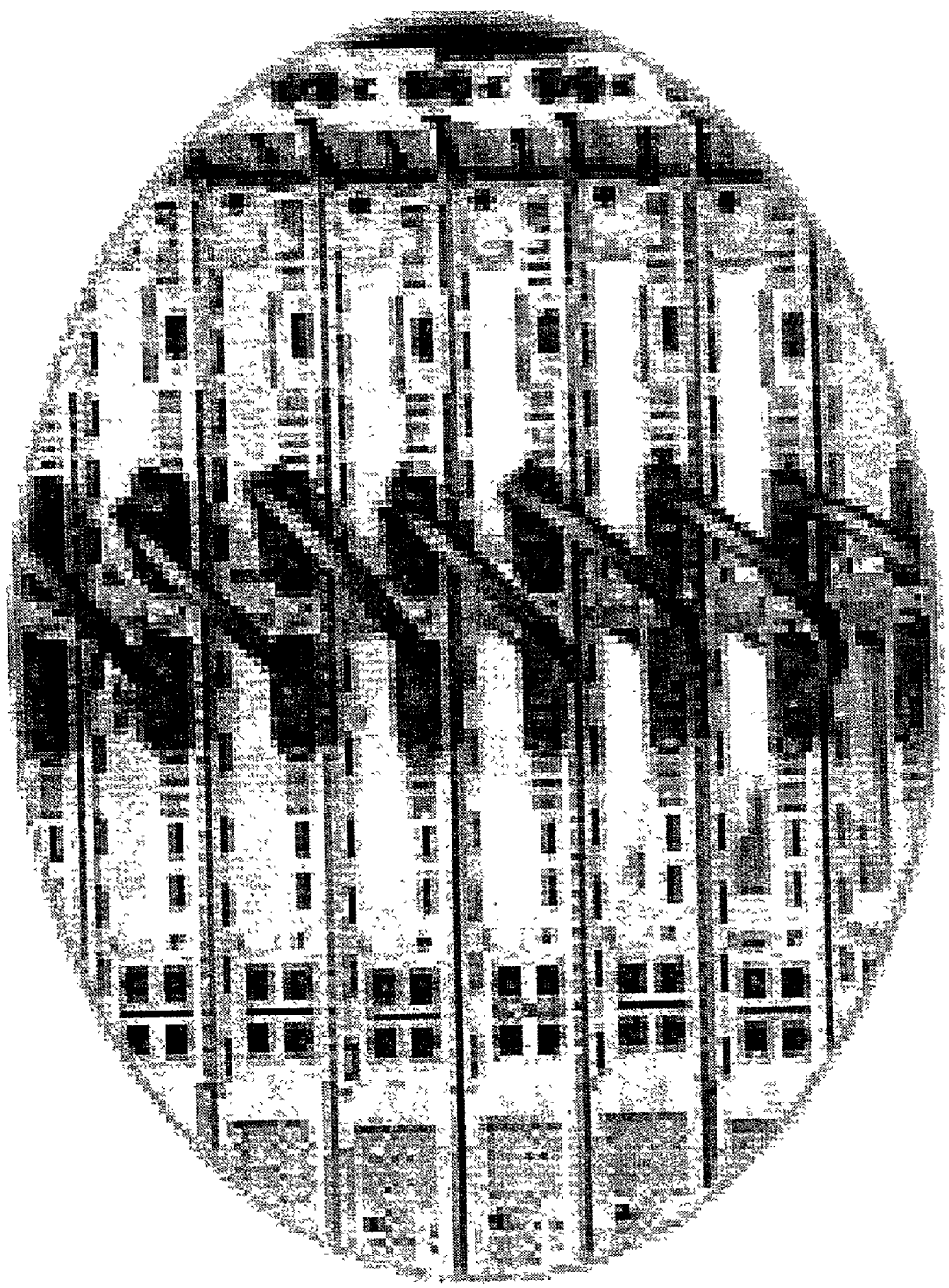
Figure 7:
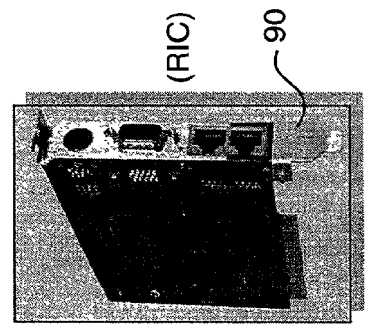
FIG. 7 illustrates an exemplary Rack Interface Pod (RIP), device for making external connections to a network according to an example embodiment of the present invention.
Figure 8:
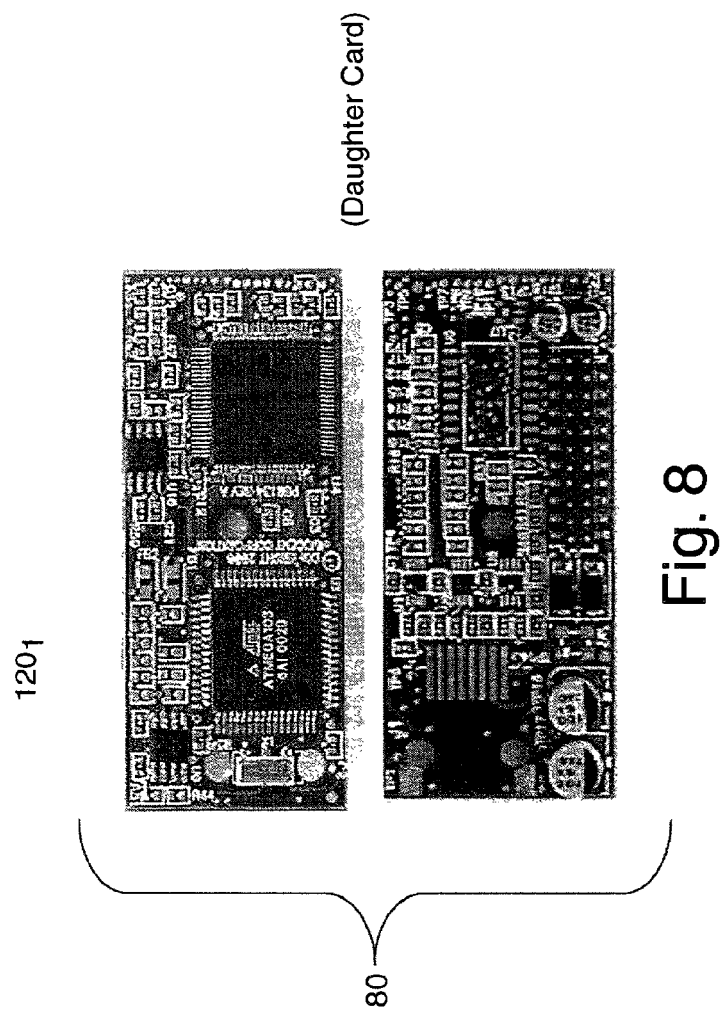
FIG. 8 illustrates a circuit board view of the RIP according to an example embodiment of the present invention.
Figure 13:
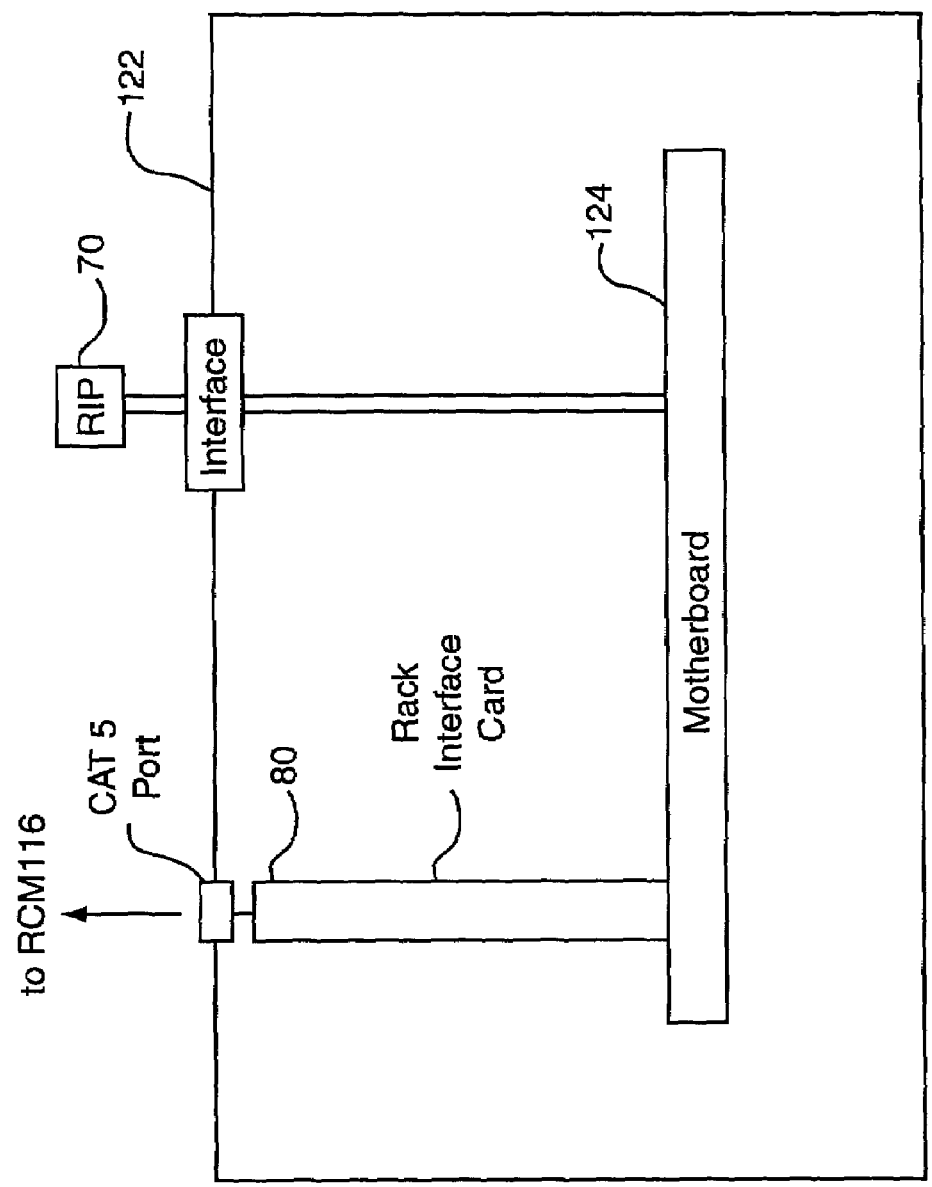
FIG. 13 is a schematic block diagram of an example server in accordance with an example embodiment of the present invention.

Referring to FIG. 13, each of the network servers 122 include a Rack Interconnect Card (RIC) interface card 90, referred to herein as RIC/daughter card as shown in FIG. 8. Each network server 122 may also include RIP 70 (FIG. 7) for receiving video signals from a network server 122 and communicating the video signals to a remote user via a local area network (LAN), preferably an Ethernet LAN. Details of circuitry within a RIP are illustrated with respect to FIG. 14 herein. The RIC 90 includes transmitter circuitry (FIG. 18) for transmitting KVM video signals to remote user 112. For example, visualizing from a high level perspective, the system for communicating information from a remote user 112 to a network server 122 includes an IPV module 114 which connects to LAN 110 to receive signals from the remote user 112. RCM 116 connects to IPV 114, wiring strips 120 connect RCM 116, and a plurality of network servers which connect to respective wiring strips 120. IPV 114, RCM 116, and wiring strips 120 act as intermediaries to the remote user 112 and the network servers 122.

In operation, IPV 114 receives KM signals from the remote user 112 via LAN 110 and KVM signals via the Avocent Longline Interconnect (ALI) 113 from the RCM 116. ALI, KVM signals received by the IPV 114 have been processed in RCM 116 by a processor located in the RCM (hereinafter "RCM processor") (92). The remote user 112 is capable of selecting a specific network server among a plurality of network servers 122 via the plurality of wiring strips 120 connected to the plurality of RCM input ports 117. The RCM processor 92 selectively processes video signals transmitted from a network server 122 and forwards the signals to the remote user 112 via the ALI port 118 and the IPV 114 and LAN 110. Likewise, the remote user's K and M strokes are passed via LAN 110 to the IPV 114, then via the ALI 118 to the RCM 116 processor which in turn processes the signals to forwards them to a respective network server 122 plugged into the wiring strip 120. The RIC 90 located in each network server 122 emulates K and M signals for a respective network server. The RIC 90 further has capability to switch video signals by encoding R, G, B signals from a respective network server 122 around a common mode voltage. The common mode voltage is raised or lowered to select a video signal from a network server 122.

In another embodiment, communications between user 112 and a server 122 are performed via LAN 110 and the RCM 116 bypassing AVI 114. The operation of the present invention, however, is analogous to the operation of embodiment having AVI 114.

The present invention is equally operable performed by integrating a RIC into server 122 or by connection of a RIP externally to KVM connectors of the server 122 as described above.

Figure 9:
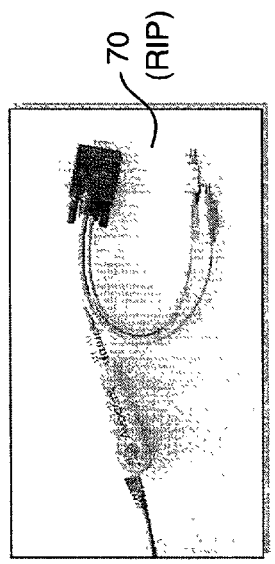
FIG. 9 illustrates a side view of a RIC (Rack Interconnect) PCI card used for gaining access to a network server power control and maintenance features according to an example embodiment of the present invention.

The common mode signal method for activating video-on and video-off signal is an extension of the H and V sync coding methodology. Various schematics are described below to show how the system as shown in FIG. 12 operates. The RCM includes a processor 92 which detects and digitizes (KVM signals) from the various servers (each having RIC/RIPs as shown in FIGS. 7-9) selected through the wiring strip 120. Switches present in the RCM 116 select which video signals from among the plurality of RIC/RIP and PEM signals connected to the AI inputs 117 to digitize and pass through the Ethernet LAN 110 to the remote user 112. Likewise, the remote user's K, M strokes are passed via the Ethernet LAN 110 to RCM processor 92 which passes the signals to a server 122 that is plugged into the wiring strip 120. RCM processor 92 may also communicate K, M stokes directly to a server 12 without going through wiring strip 120. The RIC/RIP 90,70 respectively emulate the K and M signals for a respective server to which they are interfaced. The RIC/RIP 90, 70, respectively, further provide a mechanism for switching which server's video is passed through the wiring strip to the RCM. This is done by raising or lowering the common mode (CM) voltage on the video. If a particular server is not selected, that particular server turns OFF video information portion of it's video source by forward coupling to the RCM so that no interference is induced due to parasitic capacitive coupling present in the wiring strip (PEM) 120, thus eliminates video noise.

As noted above, a network server RIP may be directly connected to an RCM system AI input. The purpose of connecting a server on it's own to RCM input is based upon, for example, importance of the individual server, requirements for blocking or not blocking access to the connected servers, and the degree of accessibility desired to a particular server as determined by a user.

The wiring strip defines a short haul intra/inter rack single Category 5 (CAT5) cable KVM connection interface. This interface is implemented on the four Category 5 (CAT5) wire pairs as follows:

Red Out+
Red Out−
Green Out+
Green Out−
Blue Out+
Blue Out−
Command+
Return

The Command wire is a half-duplex, multi-drop, asynchronous data connection between the RCM and the RICs/RIPs. This connection is used to control the active RIP or RIC on a given RCM AI port and to pass keyboard (K) and mouse (M) information between the RCM and the active RIP. Additionally, this path supports the upgrading of RIP software.

Figure 6:
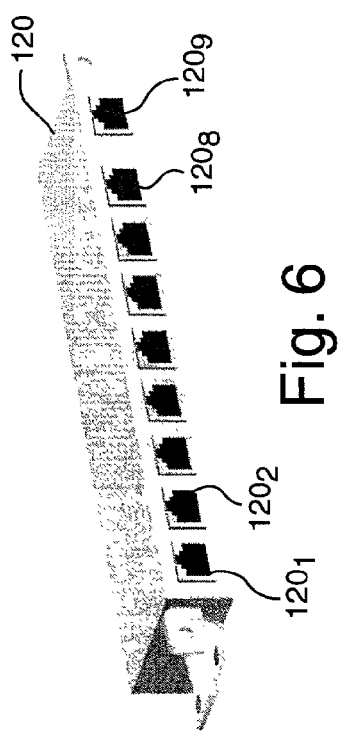
FIG. 6 illustrates an exemplary POD Expansion Module (PEM) (wiring strip) in accordance with an example embodiment of the present invention.

Referring now to FIG. 6, there is shown a rack interconnect system/wiring strip 120 according to the present invention. This system 120 may be expanded to provide connectivity to virtually unlimited number of computers inside a single rack. This system further provides a single CAT5 interconnection for an analog KVM. Wiring strip 120 includes 8 rack interconnect inputs $120_1$-$120_8$, and an output $120_9$. The wiring strip 120 is capable of interfacing with a KVM switch, a server, and another wiring strip.

Figure 10:
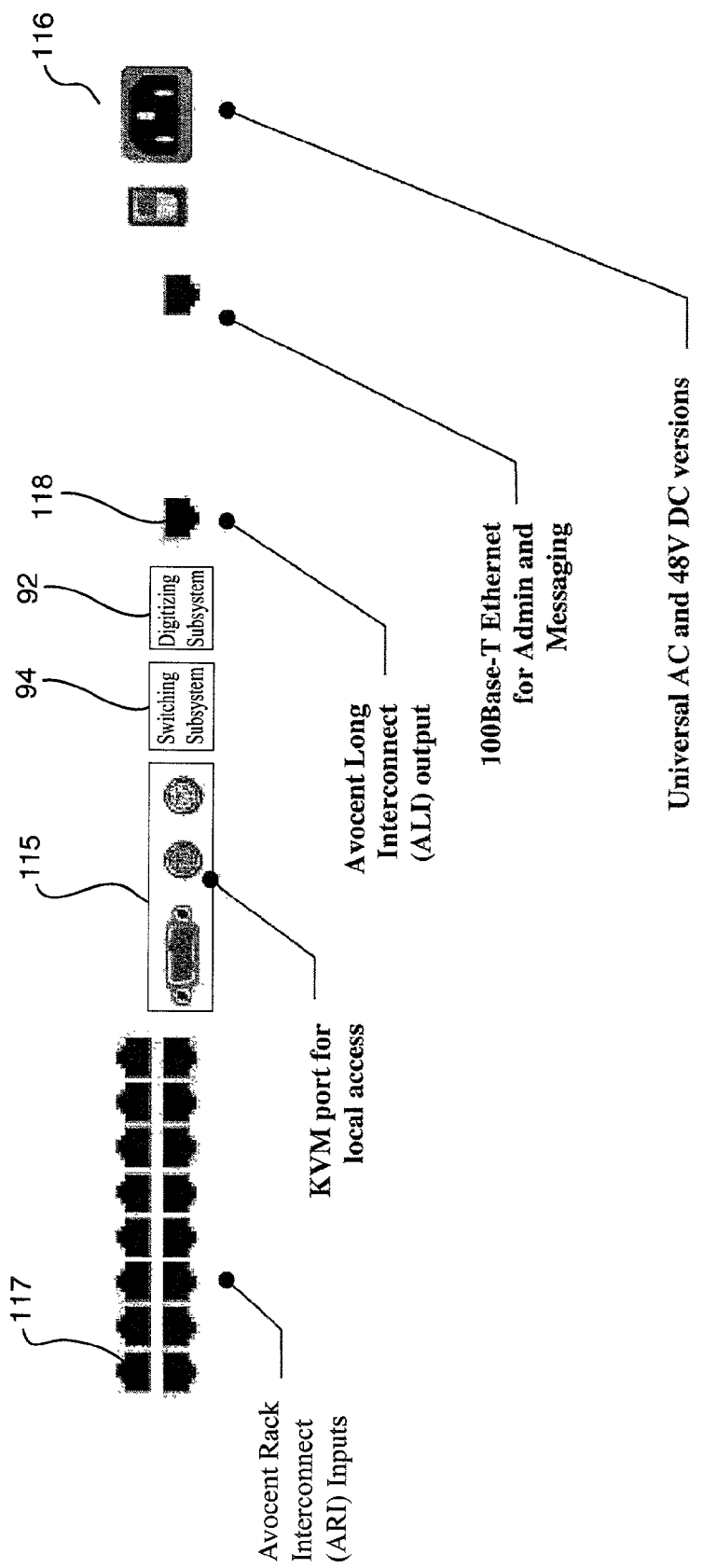
FIG. 10 illustrates a back view of a Rack Connection Manager (RCM) according to an example embodiment of the present invention.
Figure 10A:
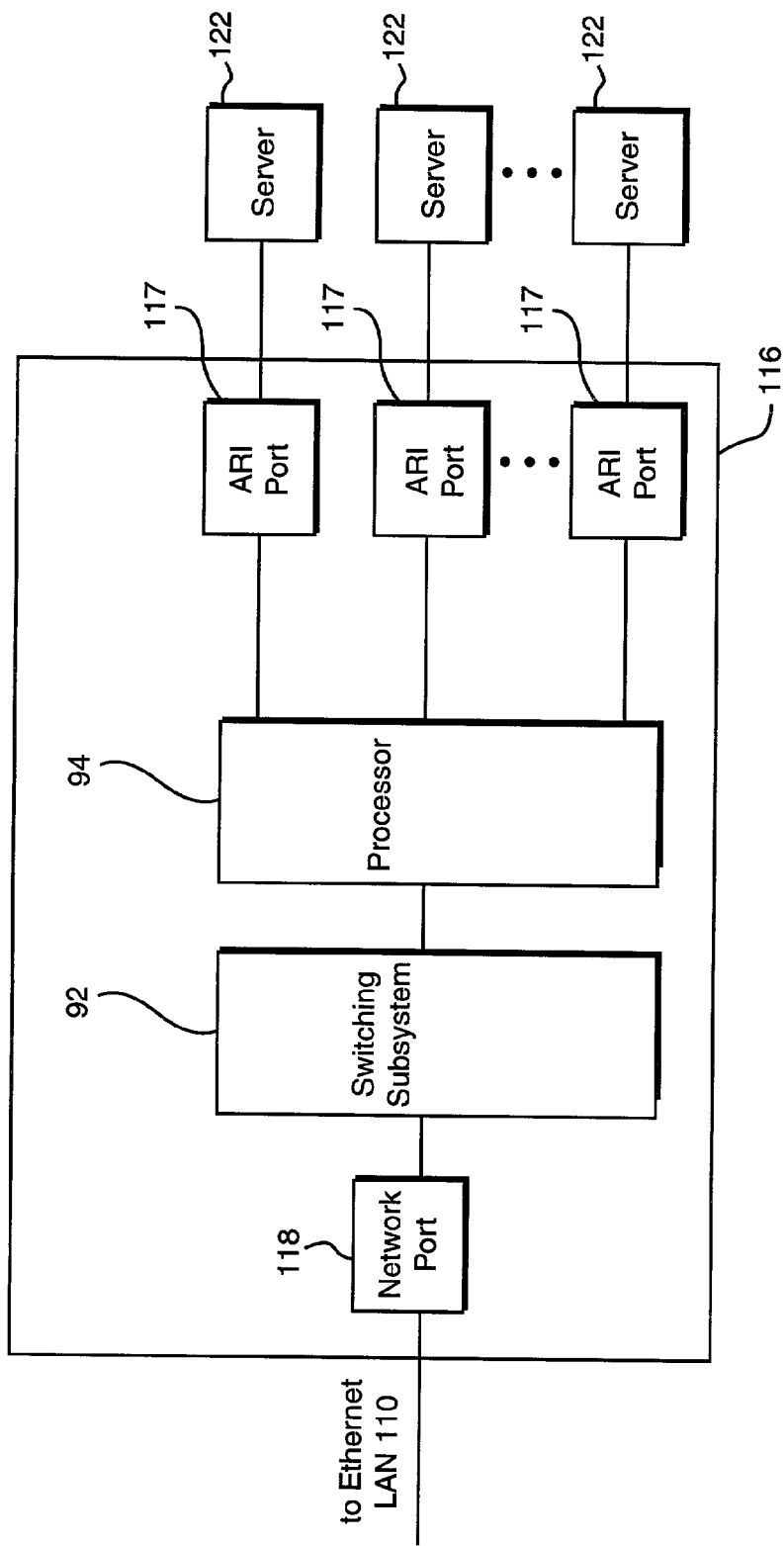
FIG. 10A illustrates a detailed exemplary view of the RCM as identified in FIG. 10.

Referring now to FIG. 10, there is shown an exemplary rack connection manager (RCM) 116 as in FIG. 12 having a plurality of interconnect inputs 117, a KVM port 115 for local access, an ALI port 118, and a 100 base-T Ethernet LAN port 119. Port 119 may be used by remote user 112 for either server console access to servers 122 or communicating administrative and maintenance information to the RCM, or for updating RCM and RIC/RIP software. As noted above, the RCM 116 includes RCM processor 92 and a matrix switch/switching subsystem 94. The RCM 116 provides access to multiple simultaneous users via LAN 110 without interference. A wiring strip 120 (FIG. 6) and the network server 122 via RICs and RIPs (FIG. 13) may be connected to ARI inputs 117 of the RCM 116 in any combinations. The RCM 116 further includes receiver circuitry 160 which accepts signals from ARI inputs 117, the details of which are discussed with respect to FIG. 16. FIG. 10A shows an exploded view of the RCM as identified in FIG. 10.

Figure 11:
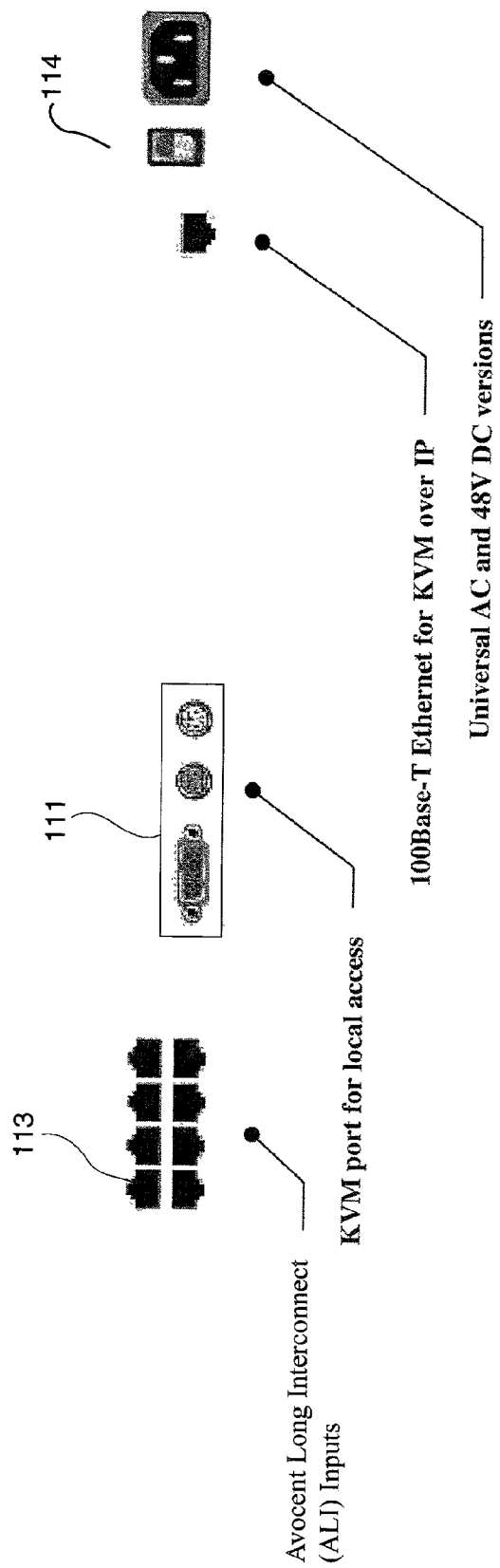
FIG. 11 illustrates a back view of an analog IP video module according to an example embodiment of the present invention.

Referring now to FIG. 11, there is shown an exemplary analog IP video (IPV) module 114. The IPV module provides access to multiple users without interference between users. The IPV module includes one local KVM output port 111 comprising VGA and PS-2 keyboard and mouse connections. It also supports multiple simultaneous digital KVM-over-IP connections via ports 113. IPV module 114 further provides a single LAN IP connection to all of its inputs, supporting such actions as, for example, network server 122 selection, server 122 console operations and IPV configuration and administrative functions. IPV module 114 further provides skew compensation to ALI input signals for UTP runs of up to 300 meters.

Referring now to FIG. 13, there is shown an exemplary schematic block diagram of a server 122 in accordance with the present invention. Each server 122 shown in FIG. 12 includes a motherboard 124, and a RIC 90. Other components, not shown for the purposes of brevity, may also be present in the server 122. The server 122 can be a standard PC with a Rack Interconnect PCI card allowing the server 122 to communicate to a remote user 112 via an RCM and network 110. The network 110 can be a LAN or other network and can follow the Ethernet, IP/TCPIP or other data protocol without any protocol restrictions. The server 122 receives keyboard and mouse instructions from a keyboard and mouse emulation performed in the RIC and connected to its keyboard and mouse ports at the motherboard 124. Further, video and keyboard and mouse signals from the motherboard 124 are passed via the RIC 90 to the RCM 116.

FIGS. 7-9 show various alternate embodiments for obtaining access to a server console interfaces. FIG. 7 illustrates a rack interface pod (RIP) for providing external connection to a server. FIG. 8 shows a daughter card designed to directly mount on a motherboard of a server. The daughter card provides full integration with the motherboard maintenance signals available within the server system. FIG. 9 shows a Rack Interconnect PCI card embodiment which also is capable of providing access to a server power control and other maintenance features.

Figure 14:
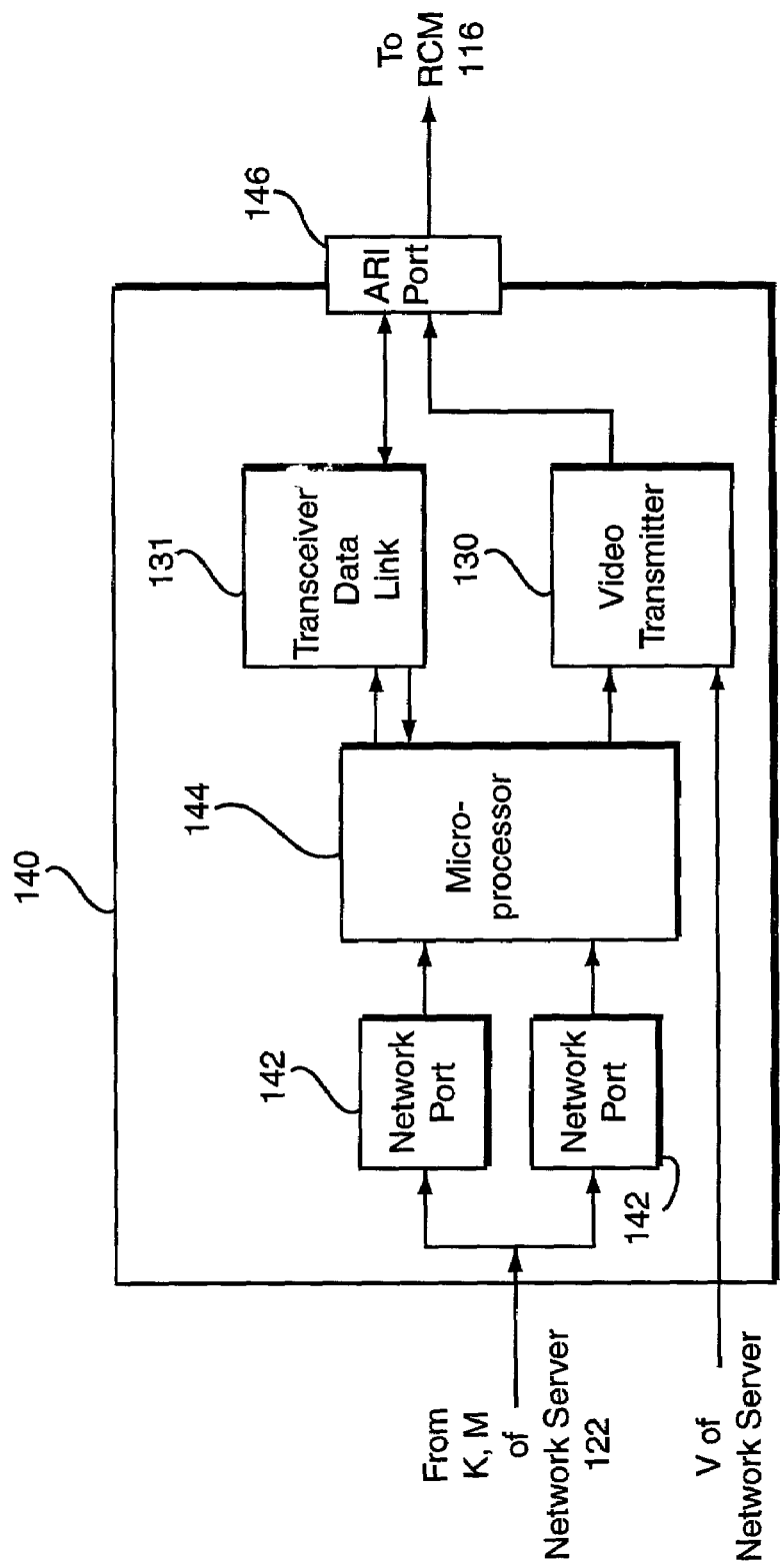
FIG. 14 illustrates a block diagram of a RIP circuitry in accordance with an example embodiment of the present invention.
Figure 20:
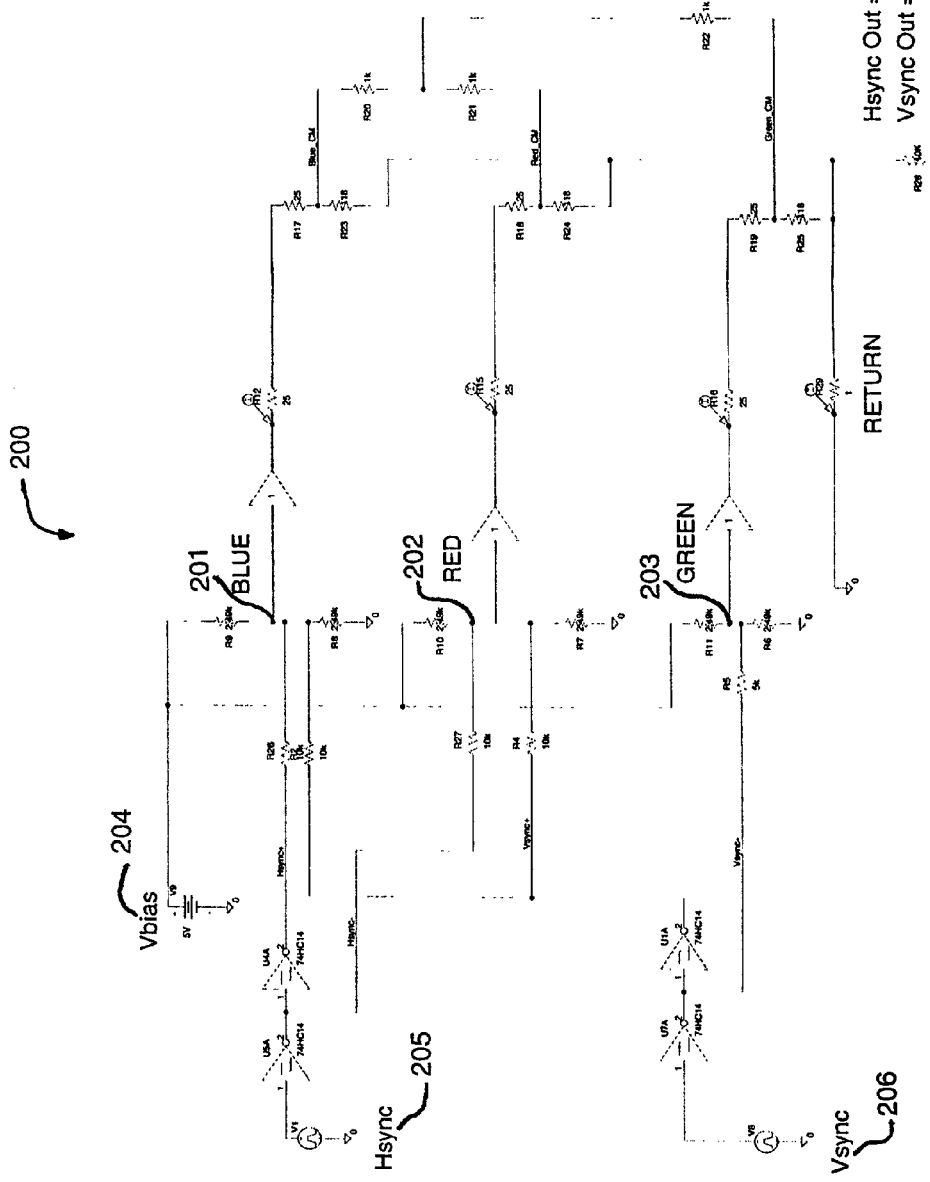
FIG. 20 illustrates a RIC common mode current path having video synchronization signals encoded in a quasi-differential manner in accordance with an example embodiment of the present invention.

FIG. 14 shows a schematic 140 of various subsystems, present within a RIP 70. Schematic 140 includes a plurality of interface ports for receiving Video (V), keyboard (K) and mouse (M) signals from a respective network server 122, a microprocessor 144, datalink transceiver subsystem 131, and transmitter circuitry 130 all located in the RIP 70. Processor 144 controls switching functions in order to combine $V_{bias}$, $H_{sync}$ and $V_{sync}$ signals 204, 205, 206, respectively to generate common mode signals as illustrated in FIG. 20.

Referring to FIG. 15, there is shown an exemplary switching circuitry 150 having a plurality of diodes 151, 152 per differential pair for each connection to a common differential pair switched wire bus. Switching circuitry 150 is located in each port of the wiring strip 120, the details of which are set forth above with respect to FIG. 12. By providing both common mode and differential mode terminations at the receiving end of the bus, individual diode connections are turned on/off by varying the common mode voltages associated with a network server 122. In this fashion, the video from network servers 122 are switched without active switching elements, rather the common voltage is raised or lowered in order to select a video signal from a network server 122.

In another embodiment, for single ended pairs, a composite sync-on-green encoding technique is used for sync processing wherein H and V sync signals are combined into a composite sync signal. The composite sync signals is further combined with a green video channel. This encoding technique is used to select a network server 122 among a plurality of network servers. For the sake of brevity, the details of sync-on-green encoding technique are not set forth herein.

Figure 17:
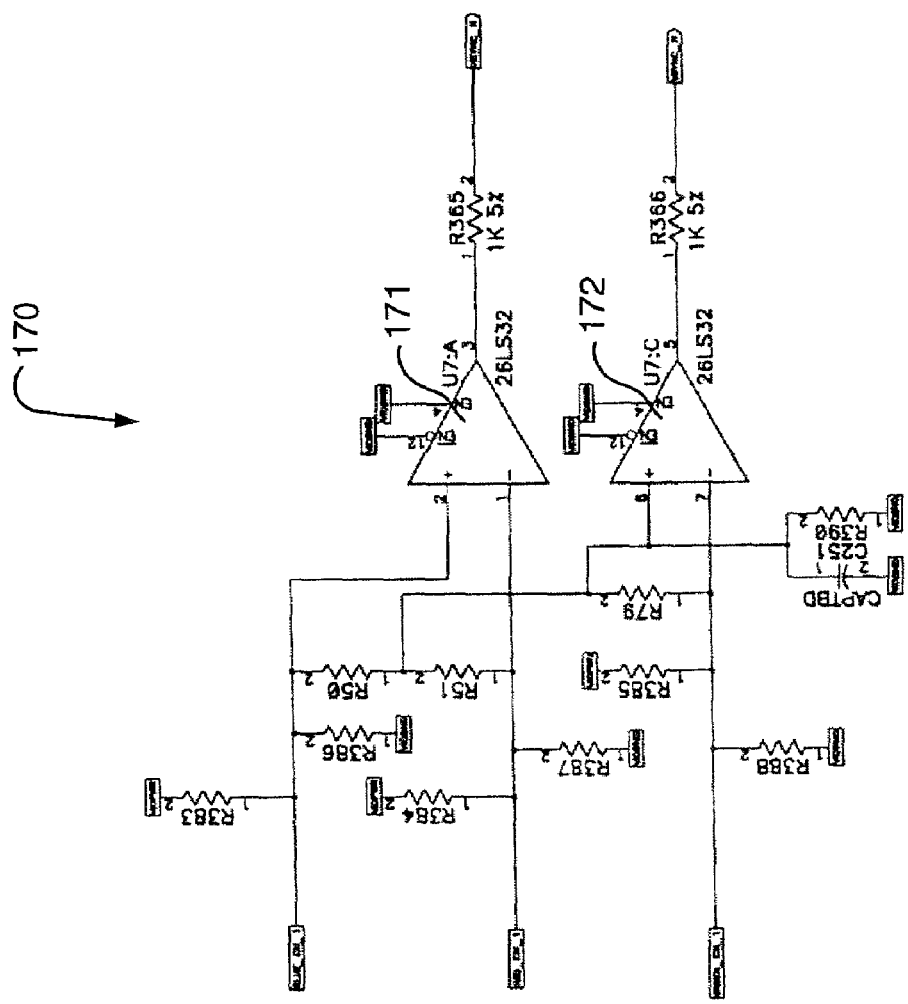
FIG. 17 illustrates an exemplary circuit for decoding $H_{sync}$ and $V_{sync}$ signals from common mode signals according to an example embodiment of the present invention.
Figure 18:
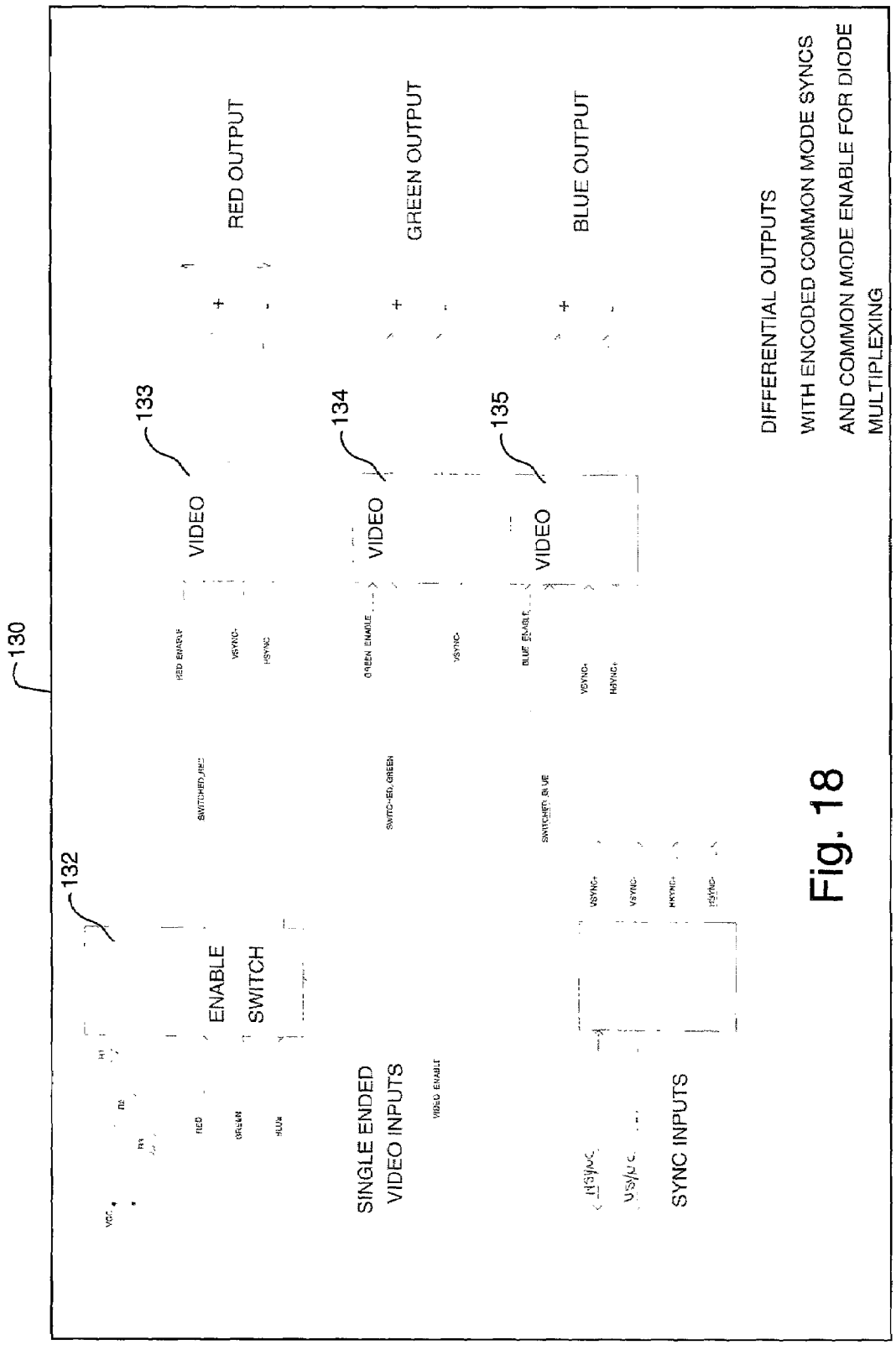
FIG. 18 illustrates a Rack Interconnect Channel (RIC) video transmitter circuitry in accordance with an example embodiment of the present invention.

Referring now to FIG. 16, there is shown an exemplary receiver circuit 160 located in RCM 116 (FIG. 12). The receiver circuit is shown to include a single color component channel for the sake of clarity. It will be understood that each of the R, G, B channels include each such receiver circuit in each RCM 116. FIG. 17 discloses the details of a circuit for implementing a decoder for the $H_{sync}$ and $V_{sync}$ signals that are combined with common mode signals in order to produce differential outputs with encoded common mode sync signals for diode multiplexing purposes as shown in FIG. 18. Differential receivers 171, 172 are used to decode the $H_{sync}$ and $V_{sync}$ signals rejecting both the R, G, and B video components and the DC common mode current used to control the differential switching diodes illustrated in FIG. 15.

FIG. 18 illustrates the details of an exemplary Rack Interconnect Circuit Channel video transmitter circuitry 130. The schematic illustrates the differential outputs with encoded common mode synchronization signals and common mode enable signal for diode multiplexing. As noted above, video transmitter circuitry 130 is located in each RIP 70. Transmitter circuit 130 includes an enable switch 132, differential video drivers unit 133, 134, 135 for R, G, B channels, respectively. Each of the video driver units includes differential video driving circuitry. Each of the differential video driver units receives a single ended video, such as, for example, switched R, G, B signals, and converts the received signals into differential video signals to be driven on the "+" and "−" outputs of each of the video driver units 133, 134, 135. The R, G, B pairs provide differential paths for the R, G, B video signals and the video synchronization information contained on $H_{sync}$ and $V_{sync}$ signals. Each of the R, G, and B signals are centered around a common mode voltage which is defined as the sum of the enable voltages for each of R, G, B channels coming out of the enable switch 132 and the scaled $H_{sync}$ and $V_{sync}$ values. The voltages provided by the video driver outputs are as follows:

Enabled

Green Out+=(Green+$Vbias$−$Vssig$)Volts

Green Out−=(−Green+$Vbias$−$Vssig$)Volts

Red Out+=(Red+$Vbias$+$Vssig$/2−$Hssig$)Volts

Red Out−=(−Red+$Vbias$+$Vssig$/2−$Hssig$)Volts

Red Out+=(Red+$Vbias$+$Vssig$/2+$Hssig$)Volts

Red Out−=(−Red+$Vbias$+$Vssig$/2+$Hssig$)Volts where Vssig=scaled representation of the Vertical sync signal;

Hssig=scaled representation of the Horizontal sync signal; and

Vbias=constant offset

Disabled

Green Out+=0 Volts

Green Out−=0 Volts

Red Out+=0 Volts

Red Out−=0 Volts

Red Out+=0 Volts

Red Out−=0 Volts.

Therefore, for example, if the switched R signals increase by "x" volts, then the "+" output of video driver 133 increases proportionally by "x" volts, and its "−" output decreases proportionally by "x" volts. This process is similarly applicable to switched G, and switched B inputs.

Thus, for any change in the common mode voltage on any one of the three R, G, B differential outputs, there is an equal and opposite change on one of the other outputs. These changes are caused such that the summation of the alternating currents produced by driver units 133, 134, 135 on a Category 5 (CAT5) cable due to the encoded synchronization signals is zero. This requirement is necessary in order to keep signal balance while preventing signal noise and radiation. Still referring to FIG. 18, R, G, B signals are received in the enable switch 132 from a network server 122 (FIG. 12), and video enable signal is received from a processor and a switching circuit 132 also included within RIP 70. The R, G, B signals are combined with $H_{sync}$ and $V_{sync}$ signals in respective video drivers 133, 134, 135, respectively. As noted earlier, the circuitry for combining the R, G, B signals with $H_{sync}$ and $V_{sync}$ signals resides in each of the video driver units included within RIP 70.

Figure 19:
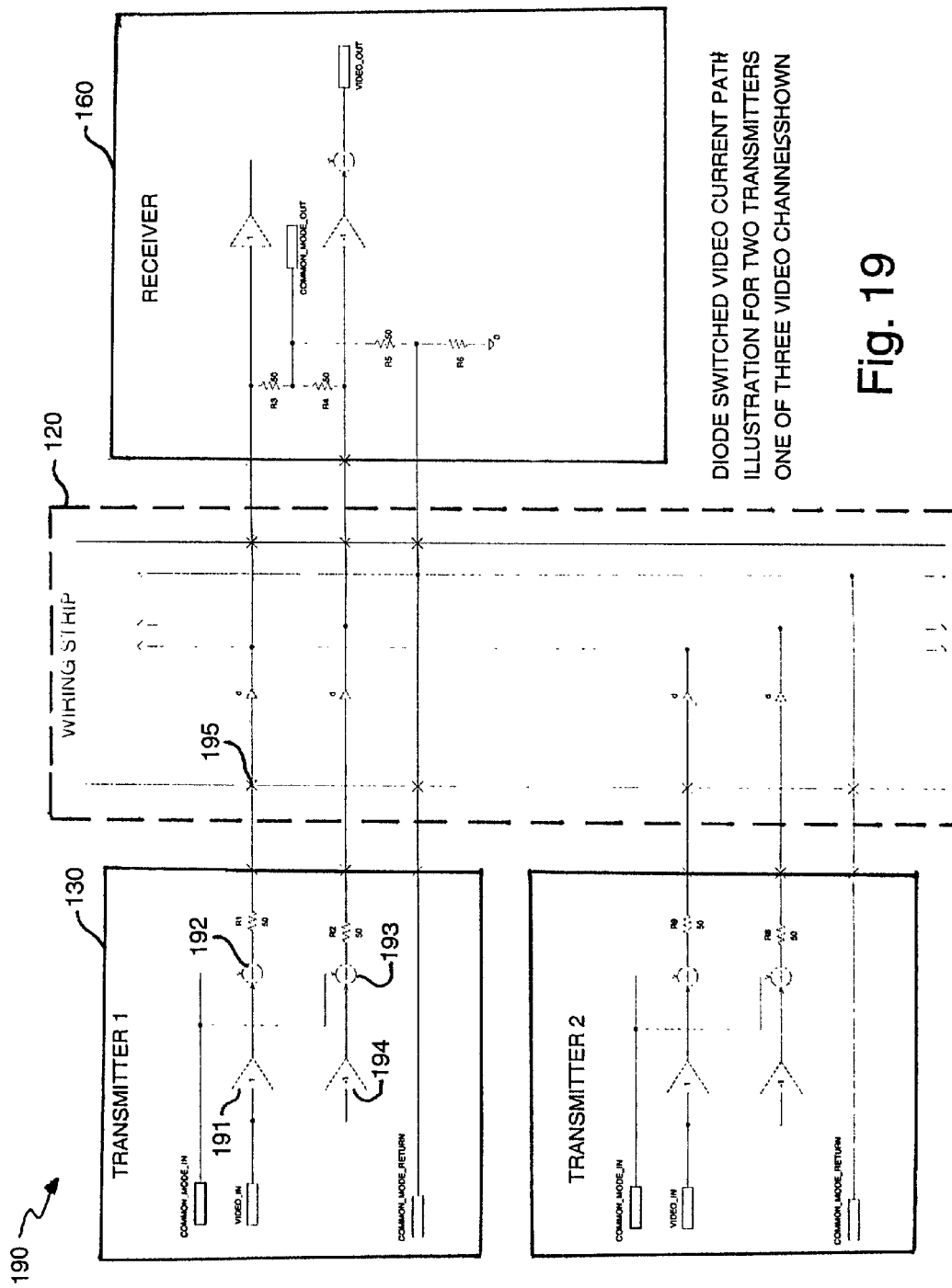
FIG. 19 illustrates a Rack Interconnect Channel (RIC) circuit including a receiver circuit in accordance with an example embodiment of the present invention.

Referring now to FIG. 19, there is shown an exemplary schematic for a diode switched video current path illustrating two transmitters, each representing a channel from a RIP 70 (FIG. 7). FIG. 19 specifically shows an exemplary model of a Red channel from two different transmitters located in distinct RIPs 70. The wiring strip provides diode switching for the differential video signals and performs splitter/combiner actions for the command connection between the connected RIC/RIPs. In this exemplary figure, VIDEO_IN is shown as a single input for the sake of brevity. It will, however, be understood that R, G, and B signals would be present for each VIDEO_IN depicted with respect to each transmitter 130. Common mode signals, generated as shown in FIG. 20, are combined with VIDEO_IN signals via exemplary buffers and summing nodes. The combined common mode and VIDEO_IN signals pass through source end terminations 195 pass through the diodes "d" in the wiring strip 120, and are summed together in port $120_9$ of the wiring strip 120 (FIG. 12). The video signals are received in the receiver (FIG. 16) located in the RCM 116.

In operation, for example, if one were to turn common mode (CM) voltage on Transmitter 1 to an ON state and place synchronization (sync) signals on the CM voltage signal, and turn CM voltage on Transmitter 2 to a "zero" state and turn its video OFF, then Transmitter 2 is turned OFF and the diodes "d" in the wiring strip 120 associated with Transmitter 2 are reverse biased and removed from the bus in the wiring strip 120. Thus, switching of active video signals through the wiring strip 120 is accomplished by sourcing current through diodes "d" associated with an active channel while reverse biasing the diodes "d" associated with inactive channels. This switching mechanism along with switching off the active video drive on inactive RIPs 70 effectively prevents unwanted video "bleed through" due to diode capacitance, and thus eliminates transmission line stub effects from the inactive RIPs cabling.

FIG. 23 illustrates another example embodiment of a diode switched video current path employed in a blade server architecture. The artisan will understand known blade server architectures and their operation, in which multiple servers (or "blades") are connected into a common backplane. The present invention has application in such a blade architecture as, for example, is shown in FIG. 23.

From a comparison of FIGS. 19 and 23, one will see that the structure and operation of the blade architecture systems (FIG. 23) have correspondences in the wiring strip embodiment (FIG. 19). Indeed, the above description of the operation of the system of FIG. 19 finds equal application with respect to the system of FIG. 23 and is incorporated again herein. In the blade architecture, the transmitters (FIG. 19) are replaced by cards that plug into a backplane (FIG. 23) rather than a wiring strip. Otherwise, the operation is identical. Although only two cards are shown in FIG. 23, as many as the backplane will physically accommodate (including sealing) are envisioned. Similarly, the architecture of FIG. 23 is not limited as to the number of receivers on the backplane, though only one is shown.

As shown in FIG. 23, the diode switches are located on the backplane itself. The RIPs are preferably located in the blades.

References numbers 190A-195A, 130A, 120A and 160A in FIG. 23 all correspond to, respectively, their counterpart numbers 190-195, 130, 120 and 160 in FIG. 19 in function, operation, and relationship with the remaining architecture as a whole.

Referring now to FIG. 20, there is shown an exemplary circuit diagram for combining $H_{sync}$ and $V_{sync}$ signals with common mode signals. Circuit 200 includes resistive summing nodes 201, 202, 203 and Vbias (enable voltage). The $H_{sync}$ and $V_{sync}$ signals combine with enable voltage for each of the R, G, B signals to produce a respective common mode voltage.

Once the video signals are received by RCM 116, they are digitized and the changes in the video are observed by monitoring screen-to-screen changes in the video, and tracking the changes via Ethernet LAN 110 by the remote user 112.

Figure 21:
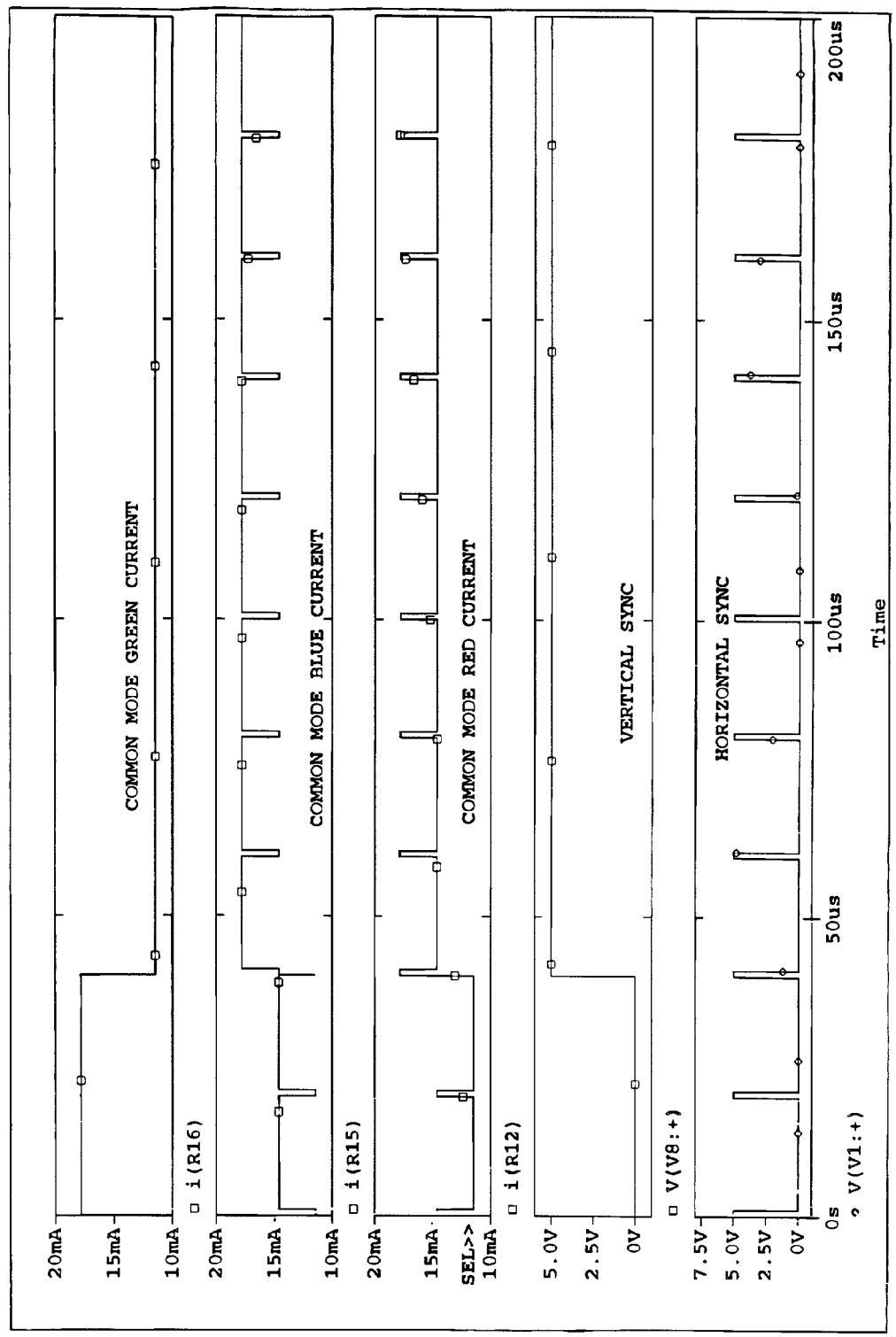
FIG. 21 illustrates a plot for common mode Red, Green, Blue synchronization signals as a function of $H_{sync}$ and $V_{sync}$ signals according to an example embodiment of the present invention.

FIG. 21 depicts an exemplary plot showing the relationship of common mode R, G, B signals as a function of $H_{sync}$ and $V_{sync}$ signals. As one can see from the depicted exemplary plot, the AC component of CM Green is shown as inverted $V_{sync}$; the AC component CM blue is shown as ½ $V_{sync}$ – $H_{sync}$; and the AC component CM Red is shown as ½ $V_{sync}$ + $H_{sync}$.

Figure 22:
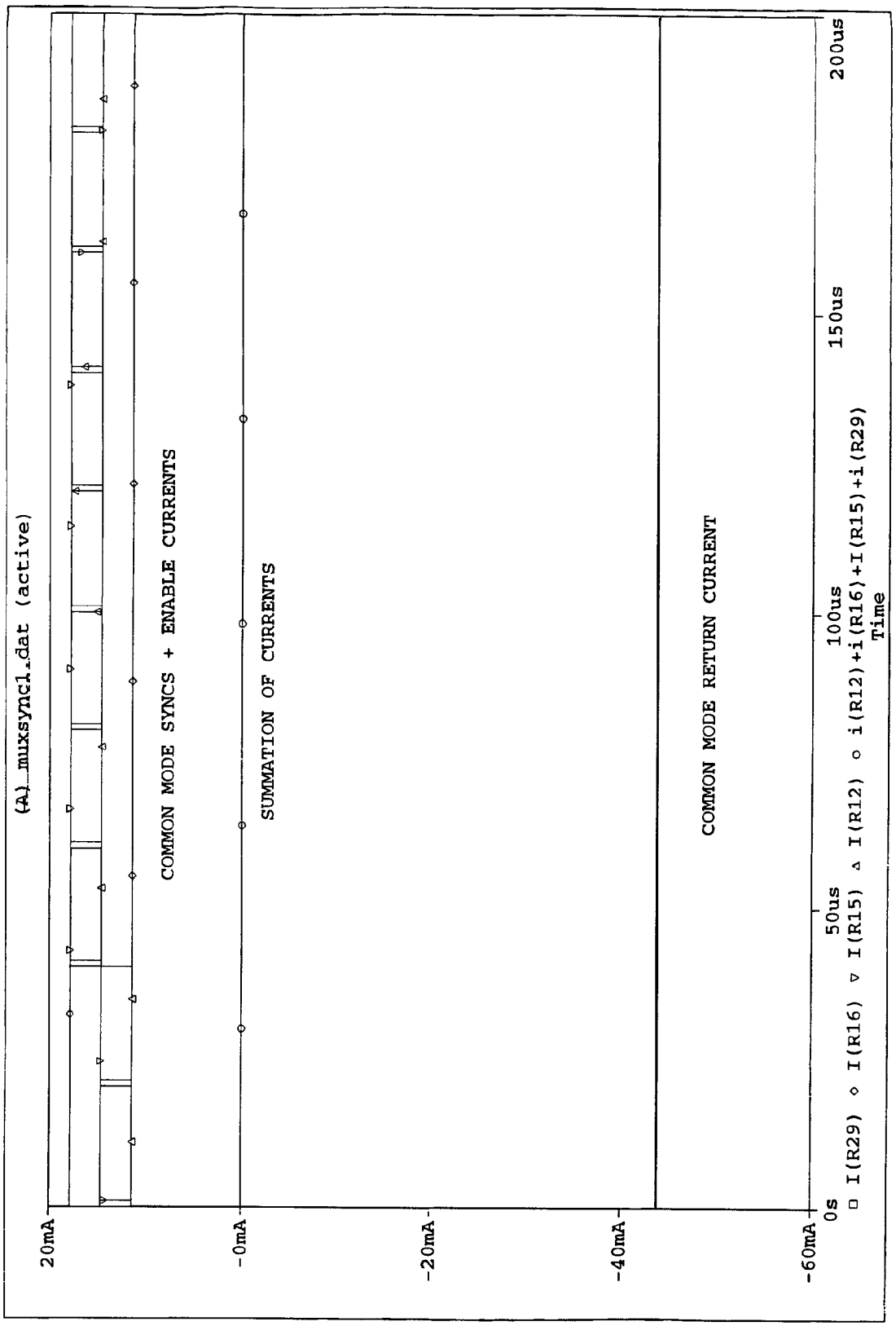
FIG. 22 illustrates a plot showing summation of currents from a transmitter to a receiver in accordance with an example embodiment of the present invention.

FIG. 22 depicts an exemplary plot showing that the summation of alternating currents from a transmitter to a receiver via the R, G, B, common mode (CM) signals equals to zero. The overlayed common mode sync signals shown in the plot represent common mode sync signals as shown in FIG. 21. The common mode return current is the summation of all CM currents flowing from the R, G, and B drivers to the receiver. Thus, the summation of the common mode syncs and the enable current less the return signals equals zero.

This method of switching video is inexpensive and it further provides flexibility in dealing with the management of servers. For example, 8×1 multiplexing or N times 8×1 multiplexing is possible with no power source required for the switching elements. The system of the present invention consumes low power and is effective placed into server rack systems. Further, several wiring strips may be mounted within a rack, the wiring strips outputs may then be routed to an RCM in another rack for administration purposes.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of encoding video synchronization signals $H_{sync}$, $V_{sync}$ within a keyboard, video, mouse (KVM) extension system, the method comprising:

encoding R, G, B video signals differentially around respective common mode voltage signals, the common mode signals representing encoded functions of combinations of the video synchronization signals; and differentially driving R, G, B video signals so as to allow removal of their respective common mode signals, such that (i) a net alternating current produced by each of the differential video signals is substantially zero; and (ii) a net alternating current produced by encoded synchronization signals is substantially zero.

2. The method of claim 1, wherein said common mode voltage signals representing video synchronization signals are removed via an analog differential amplifier.

3. A method of encoding video synchronization signals within a keyboard, video, mouse (KVM) server management system, the method comprising:
providing a plurality of interface ports for receiving KVM signals from a plurality of servers, each interface port including a differential video channel;
providing a pair of switching diodes for each differential video channel;
multiplexing different video channels down to common differential channels;
encoding R, G, B video signals around their respective common mode signals for each differential channel;
differentially driving R, G, B video signals and their respective common mode signals, said common mode signals representing functions of video synchronization signals $H_{sync}$ and $V_{sync}$, respectively;
switching individual differential video channels by varying common mode voltages of respective individual differential channels, and forward biasing or reverse biasing the switching diodes for enabling or disabling a respective differential channel; and
providing both common mode and differential mode terminations at a receiving end of the R, G, B video signals so as to remove common mode signals from said video signals and extract original video synchronization signals.

4. A method of interfacing KVM signals provided by an Analog Long Interconnect port to network server, said method comprising:
differentially driving R, G, B video channel signals with video synchronization encoded on respective common mode signals, the common mode signals representing encoded functions of combinations of the video synchronization signals;
providing corrective frequency compensation for the transmission losses encountered by R, G, B channel signals in extended cabling;
multiplexing between a plurality of cabling extensions; and
forwarding the R, G, B channel signals to a remote user through a network interface.

5. A keyboard, video, mouse (KVM) server management system, comprising:
a plurality of network interfaces, each interface having network ports for communicating KVM signals to a remote user workstation, each said user workstation communicatively coupled to the network for communicating KVM signals to a plurality of network servers via corresponding network ports; and
a switch for communicating KVM signals between the remote user workstations and a select network server from among said plurality of network servers.

6. A method of encoding video synchronization signals within a keyboard, video, mouse (KVM) server management system, the method comprising:
providing a plurality of interface ports for receiving KVM signals from a plurality of servers;
providing in each server interface port a pair of switching diodes for each differential video channel;
multiplexing differential video channels down to common differential channels;
encoding R, G, B video signals around their respective common mode signals for each differential channel;
differentially driving R, G, B video signals and their respective common mode signals, said common mode signals representing functions of video synchronization signals Hsync and Vsync, respectively;
switching differential channels by varying the common mode voltages of respective channels; and
receiving both common mode and differential mode terminations at a receiving end.

7. The method of claim 6, wherein the switching step further comprising:
forward biasing or reverse biasing the switching diodes in order to enable or disable respective individual channels.

8. The method of claims 7, further comprising:
providing R, G, B video signals so as to remove common mode signals from said video signals; and
extracting original video synchronization signals.

9. A keyboard, video, mouse (KVM) server management system, comprising:
a network interface unit comprising:
a network port communicatively coupled to a network to communicate digitized KVM signals with a remote user workstation via said network;
a plurality of interface ports communicatively coupled directly to a corresponding plurality of servers via corresponding lines;
a signal conditioner to convert native KVM signals from a server into an intermediate format for transmission over one of the corresponding lines;
at least one switch communicatively coupled to at least one interface port for communicating keyboard and mouse signals between a select server among a plurality of servers coupled to said switch via corresponding lines, each line coupled to said switch comprising a plurality of wires, each said wire including a single diode; and
wherein R, G, B signals are encoded around their respective common mode voltage signals using a sync on green encoding on one of R, G, B color components in order to select a server among said plurality of servers, the common mode signals representing encoded functions of combinations of video synchronization signals.

10. A method of encoding video synchronization signals in a keyboard, video, mouse (KVM) server management system, comprising:
communicatively coupling a network port of a network interface unit to a network for communicating digitized KVM signals with a remote user workstation;
communicatively coupling a plurality of interface ports to a corresponding plurality of servers via corresponding lines;
converting native KVM signals from a server into an intermediate format for transmission over one of the corresponding lines;
communicatively coupling at least one switch to at least one interface port for communicating keyboard and mouse signals between a select server among a plurality of servers coupled to said switch via corresponding lines, each line coupled to said switch comprising a plurality of wires, each said wire including a single diode; and
encoding R, G, B signals are around their respective common mode voltage signals using a sync-on-green technique in order to select a server among said plurality of servers, the common mode signals representing encoded functions of combinations of video synchronization signals.

11. A keyboard, video, mouse (KVM) server extension system, comprising:

a network interface unit comprising:

a network port communicatively coupled to a network to communicate digitized KVM signals with a remote user workstation via said network;

an interface port to communicatively couple to a server via a communication link; and a signal conditioner to convert native KVM signals from the server into an intermediate format for transmission over the communication link.

12. A video signal switch, comprising:

a plurality of server blade backplane slots to receive server blades outputting a corresponding plurality of differentially encoded video signals around a plurality of common mode voltages;

a backplane in which the plurality of server blades in the backplane slots commonly connect and communicate, the backplane including a pair of diodes for each of said blades to control switching among the plurality of differentially encoded video signals; and at least one receiver communicating with the backplane to receive the differentially encoded video signals switched by the diodes.

13. A switch as in claim 12, wherein the receiver is physically coupled to the backplane.

14. A method of encoding video synchronization signals $H_{sync}$, $V_{sync}$ within a keyboard, video, mouse (KVM) extension system, the method comprising:

encoding R, G, B video signals differentially around respective common mode voltage signals, the common mode signals representing encoded functions of combinations of both the video synchronization signals $H_{sync}$, $V_{sync}$; and differentially driving R, G, B video signals so as to allow removal of their respective common mode signals, such that (i) a net alternating current produced by each of the differential video signals is substantially zero; and (ii) a net alternating current produced by encoded synchronization signals is substantially zero.

\* \* \* \* \*

UNITED STATES PATENT AND TRADEMARK OFFICE
CERTIFICATE OF CORRECTION

PATENT NO. : 7,424,551 B2
APPLICATION NO. : 09/951774
DATED : September 9, 2008
INVENTOR(S) : Vic Odryna et al.

It is certified that error appears in the above-identified patent and that said Letters Patent is hereby corrected as shown below:

Title page, item [54], the title should read "PASSIVE VIDEO MULTIPLEXING METHOD AND APPARATUS" instead of incorrectly "PASSIVE VIDEO MULTIPLEXING METHOD AND APPARATUS PRIORITY TO PRIOR PROVISIONAL APPLICATION".

Signed and Sealed this

Sixteenth Day of November, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,424,551 B2 | Page 1 of 1 |
| APPLICATION NO. | : 09/951774 | |
| DATED | : September 9, 2008 | |
| INVENTOR(S) | : Vic Odryna et al. | |

It is certified that error appears in the above-identified patent and that said Letters Patent is hereby corrected as shown below:

Title page, item [54] and at Column 1, lines 1-3, the title should read "PASSIVE VIDEO MULTIPLEXING METHOD AND APPARATUS" instead of incorrectly "PASSIVE VIDEO MULTIPLEXING METHOD AND APPARATUS PRIORITY TO PRIOR PROVISIONAL APPLICATION".

This certificate supersedes the Certificate of Correction issued November 16, 2010.

Signed and Sealed this

Fourteenth Day of December, 2010

David J. Kappos
*Director of the United States Patent and Trademark Office*